(12) United States Patent
Katoh et al.

(10) Patent No.: US 8,525,953 B2
(45) Date of Patent: *Sep. 3, 2013

(54) DISPLAY DEVICE

(75) Inventors: Hiromi Katoh, Osaka (JP); Yasuhiro Sugita, Osaka (JP); Kohhei Tanaka, Osaka (JP); Kaoru Yamamoto, Osaka (JP); Naru Usukura, Osaka (JP); Hiroaki Shigeta, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/497,383

(22) PCT Filed: Jun. 8, 2010

(86) PCT No.: PCT/JP2010/059683
§ 371 (c)(1),
(2), (4) Date: Mar. 21, 2012

(87) PCT Pub. No.: WO2011/040091
PCT Pub. Date: Apr. 7, 2011

(65) Prior Publication Data
US 2012/0176357 A1    Jul. 12, 2012

(30) Foreign Application Priority Data
Sep. 30, 2009    (JP) ................... 2009-226564

(51) Int. Cl.
*G02F 1/133*    (2006.01)
(52) U.S. Cl.
USPC ........................................... 349/72

(58) Field of Classification Search
USPC .................. 349/56, 61, 68, 69, 72, 73, 74
See application file for complete search history.

(56) References Cited

U.S. PATENT DOCUMENTS 6,144,366 A    11/2000    Numazaki et al.
(Continued)

FOREIGN PATENT DOCUMENTS

JP    11143633 A    5/1999
JP    3521187 B    2/2004
(Continued)

OTHER PUBLICATIONS

International Search Report—Jul. 4, 2011.

*Primary Examiner* — Jennifer Doan
(74) *Attorney, Agent, or Firm* — Harness, Dickey & Pierce, P.L.C.

(57) ABSTRACT

A plurality of first and second sensor pixel circuits each sensing light during a designated sensing period and retaining the amount of sensed light otherwise are arranged in a pixel region. A backlight is turned on once for a predetermined time in one-frame period. A sensing period when the backlight is turned on and a sensing period when the backlight is turned off are set once, respectively, in the one-frame period. The first sensor pixel circuit is reset. The second sensor pixel circuit is reset. Read from sensor pixel circuits of two types is performed in parallel in a line sequential manner during a period other than the periods and. A difference circuit provided outside of the sensor pixel circuits is used for obtaining a difference between an amount of light when the backlight is turned on and an amount of light when the backlight is turned off.

15 Claims, 17 Drawing Sheets

(56) References Cited

U.S. PATENT DOCUMENTS

| | | |
|---|---|---|
| 2005/0275616 A1 | 12/2005 | Park et al. |
| 2006/0103637 A1 | 5/2006 | Yamaguchi et al. |
| 2006/0256093 A1 | 11/2006 | Furukawa et al. |
| 2007/0013646 A1 | 1/2007 | Harada |
| 2008/0211787 A1 | 9/2008 | Nakao et al. |
| 2009/0213095 A1 | 8/2009 | Harada et al. |
| 2009/0225088 A1 | 9/2009 | Aoki |
| 2012/0176355 A1* | 7/2012 | Sugita et al. .................. 345/207 |
| 2012/0176356 A1* | 7/2012 | Usukura et al. ............... 345/207 |

FOREIGN PATENT DOCUMENTS

| | | |
|---|---|---|
| JP | 2005352490 A | 12/2005 |
| JP | 2006317682 A | 11/2006 |
| JP | 2007-025796 A | 2/2007 |
| JP | 2007065508 A | 3/2007 |
| JP | 4072732 | 2/2008 |
| JP | 2008203561 A | 9/2008 |
| JP | 2009064074 A | 3/2009 |
| JP | 2009205423 A | 9/2009 |
| JP | 2009217461 A | 9/2009 |

* cited by examiner

Fig. 10
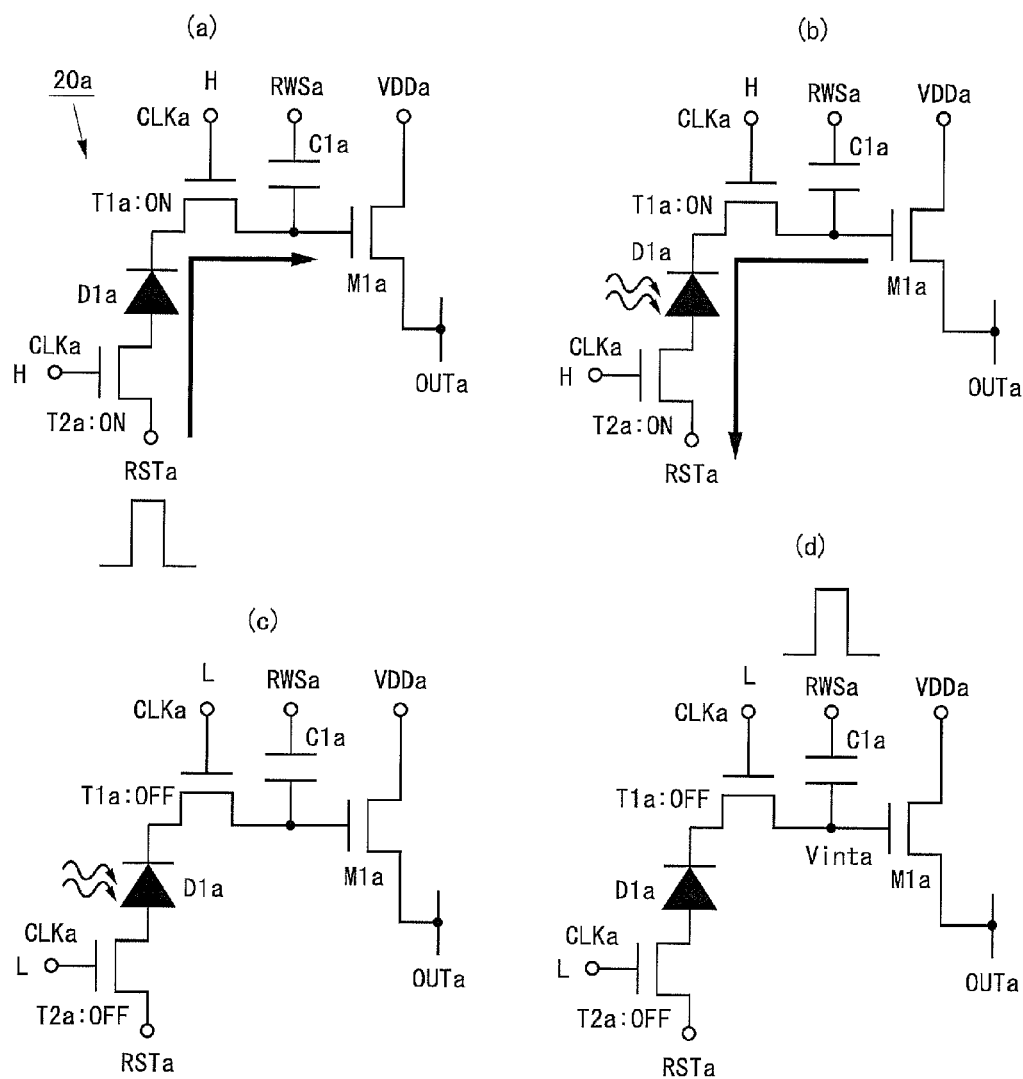
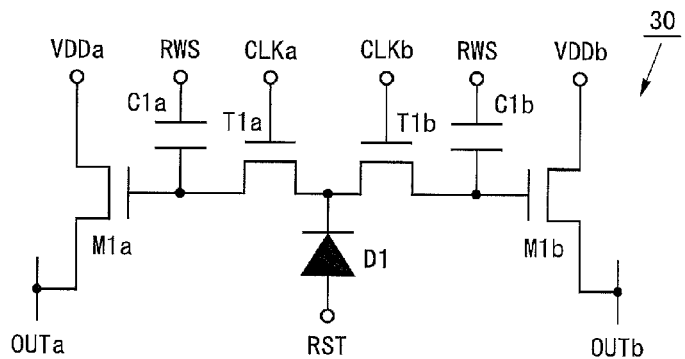
Fig. 11

US 8,525,953 B2

DISPLAY DEVICE

TECHNICAL FIELD

The present invention relates to display devices, and more particularly to a display device in which a plurality of optical sensors are arranged in a pixel region.

BACKGROUND ART

With regard to display devices, heretofore, there have been known methods of providing input functions such as touch panels, pen input and scanners in such a manner that a plurality of optical sensors are provided on a display panel. In order to adapt such a method to a mobile appliance to be used under various light environments, it is necessary to eliminate an influence of the light environment. Therefore, there has also been known a method of removing a component depending on a light environment from a signal sensed by an optical sensor to obtain a signal to be input intrinsically.

Patent Document 1 describes an input/output device in which light receiving elements are provided corresponding to individual displaying elements. In the input/output device, a backlight is turned on and off once in a one-frame period, and reset for and read from the light receiving elements are performed in a line sequential manner so that an amount of light during a backlight turn-on period and an amount of light during a backlight turn-off period are obtained from all the light receiving elements in the one-frame period.

FIG. 22 is a diagram showing turn-on and turn-off timings of the backlight as well as reset and read timings of the light receiving elements, in Patent Document 1. As shown in FIG. 22, in the one-frame period, the backlight is turned on in the former half and is turned off in the latter half. During the backlight turn-on period, the reset for the light receiving elements is performed in a line sequential manner (a solid line arrow), and then the read from the light receiving elements is performed in a line sequential manner (a broken line arrow). Also during the backlight turn-off period, the reset for and read from the light receiving elements are performed in the similar manner.

Patent Document 2 describes a solid-state imaging device including a unit light receiving section shown in FIG. 23. As shown in FIG. 23, the unit light receiving section includes one photoelectric converting part PD, and two charge accumulating parts C1 and C2. In the case of receiving both external light and light which is emitted from light emitting means and then is reflected from a physical object, a first sample gate SG1 turns on, and charge generated by the photoelectric converting part PD is accumulated in the first charge accumulating part C1. In the case of receiving only external light, a second sample gate SG2 turns on, and the charge generated by the photoelectric converting part PD is accumulated in the second charge accumulating part C2. It is possible to obtain a difference between the amounts of charge accumulated in the two charge accumulating parts C1 and C2, thereby obtaining an amount of light which is emitted from the light emitting means and then is reflected from the physical object.

PRIOR ART DOCUMENTS

Patent Documents

Patent Document 1: Japanese Patent No. 4072732
Patent Document 2: Japanese Patent No. 3521187

SUMMARY OF THE INVENTION

Problems to be Solved by the Invention

In a typical display device in which a plurality of optical sensors are provided on a display panel, read from the optical sensors is performed in a line sequential manner.

Moreover, backlights for a mobile appliance are turned on simultaneously and are turned off simultaneously as an entire screen.

In the input/output device described in Patent Document 1, the backlight is turned on and off once in the one-frame period. During the backlight turn-on period, a period for the reset does not overlap with a period for the read. Also during the backlight turn-off period, a period for the reset does not overlap with a period for the read. Consequently, the read from the light receiving elements needs to be performed within a ¼-frame period (for example, within 1/240 seconds in the case where a frame rate is 60 frames per second). In an actual fact, however, it is considerably difficult to perform the high-speed read described above.

Moreover, there is a deviation corresponding to a ½-frame period between a period (B1 shown in FIG. 22) during which the light receiving element senses light in the backlight turn-on period and a period (B2 shown in FIG. 22) during which the light receiving element senses light in the backlight turn-off period. Consequently, followability to motion input varies in accordance with a direction of the input. Moreover, this input/output device starts to perform the read immediately after completion of the reset, and starts to perform the reset immediately after completion of the read. Consequently, it is impossible to freely set a length and an interval with regard to the backlight turn-on period and the backlight turn-off period.

Hence, it is an object of the present invention to provide a display device that solves the problems described above, and has an input function which does not depend on light environments.

Means for Solving the Problems

According to a first aspect of the present invention, there is provided a display device in which a plurality of optical sensors are arranged in a pixel region, the display device including: a display panel that includes a plurality of display pixel circuits and a plurality of sensor pixel circuits; a light source that is turned on for a predetermined time in a one-frame period; and a drive circuit that outputs, to the sensor pixel circuits, a first control signal indicating a sensing period at time when the light source is turned on and a second control signal indicating a sensing period when the light source is turned off, and performs reset for and read from the sensor pixel circuits, wherein the sensor pixel circuits include: a first sensor pixel circuit that senses light during the sensing period when the light source is turned on and retains the amount of sensed light otherwise, in accordance with the first control signal; and a second sensor pixel circuit that senses light during the sensing period when the light source is turned off and retains the amount of sensed light otherwise, in accordance with the second control signal, and the drive circuit performs the read from the first and second sensor pixel circuits in a line sequential manner during a period other than the sensing period when the light source is turned on and the sensing period when the light source is turned off.

According to a second aspect of the present invention, in the first aspect of the present invention, the light source is turned on once for a predetermined time in the one-frame period, and the sensing period when the light source is turned on and the sensing period when the light source is turned off are set once, respectively, in the one-frame period.

According to a third aspect of the present invention, in the second aspect of the present invention, the drive circuit performs the reset for the first sensor pixel circuit at the start of the sensing period when the light source is turned on, and performs the reset for the second sensor pixel circuit at the start of the sensing period when the light source is turned off.

According to a fourth aspect of the present invention, in the second aspect of the present invention, the sensing period when the light source is turned on is set immediately after the sensing period when the light source is turned off.

According to a fifth aspect of the present invention, in the second aspect of the present invention, the sensing period when the light source is turned off is set immediately after the sensing period when the light source is turned on.

According to a sixth aspect of the present invention, in the second aspect of the present invention, the sensing period when the light source is turned on is equal in length to the sensing period when the light source is turned off.

According to a seventh aspect of the present invention, in the first aspect of the present invention, the display panel further includes a plurality of output lines for propagating output signals from the first and second sensor pixel circuits, the first and second sensor pixel circuits are connected to the different output lines depending on the type, and the drive circuit performs the read from the first and second sensor pixel circuits in parallel.

According to an eighth aspect of the present invention, in the seventh aspect of the present invention, the display device further includes a difference circuit that obtains a difference between the output signal from the first sensor pixel circuit and the output signal from the second sensor pixel circuit.

According to a ninth aspect of the present invention, in the first aspect of the present invention, each of the first and second sensor pixel circuits includes: one optical sensor; one accumulation node accumulating charge corresponding to an amount of sensed light; a read transistor having a control terminal being electrically connectable to the accumulation node; and a retention switching element that is provided on a path for a current flowing through the optical sensor and turns on or off in accordance with the control signal, the retention switching element included in the first sensor pixel circuit turns on, in accordance with the first control signal, during the sensing period when the light source is turned on, and the retention switching element included in the second sensor pixel circuit turns on, in accordance with the second control signal, during the sensing period when the light source is turned off.

According to a tenth aspect of the present invention, in the ninth aspect of the present invention, in each of the first and second sensor pixel circuits, the retention switching element is provided between the accumulation node and one of ends of the optical sensor, and the other end of the optical sensor is connected to a reset line.

According to an eleventh aspect of the present invention, in the ninth aspect of the present invention, each of the first and second sensor pixel circuits includes, as the retention switching element: a first retention switching element provided between the accumulation node and one of ends of the optical sensor; and a second retention switching element provided between a reset line and the other end of the optical sensor.

According to a twelfth aspect of the present invention, in the tenth aspect of the present invention, the first and second sensor pixel circuits share one optical sensor between two types of circuits, and the shared optical sensor has one of ends connected to one of ends of the retention switching element included in each of the first and second sensor pixel circuits, and the other end connected to the reset line.

According to a thirteenth aspect of the present invention, in the eleventh aspect of the present invention, the first and second sensor pixel circuits share one optical sensor between two types of circuits, and the shared optical sensor has one of ends connected to one of ends of the first retention switching element included in each of the first and second sensor pixel circuits, and the other end connected to one of ends of the second retention switching element included in each of the first and second sensor pixel circuits.

According to a fourteenth aspect of the present invention, in the twelfth aspect of the present invention, the first and second sensor pixel circuits share one read transistor between two types of circuits, and the shared read transistor has a control terminal connected to one of ends of the shared optical sensor and one of ends of the retention switching element included in each of the first and second sensor pixel circuits.

According to a fifteenth aspect of the present invention, there is provided a method for driving a display device having a display panel that includes a plurality of display pixel circuits and a plurality of sensor pixel circuits, and a light source, the method including the steps of: turning the light source on for a predetermined time in a one-frame period; outputting, to the sensor pixel circuits, a first control signal indicating a sensing period when the light source is turned on and a second control signal indicating a sensing period when the light source is turned off; sensing light during the sensing period when the light source is turned on and retaining the amount of sensed light otherwise, in accordance with the first control signal, by use of a first sensor pixel circuit included in the sensor pixel circuits; sensing light during the sensing period when the light source is turned off and retaining the amount of sensed light otherwise, in accordance with the second control signal, by use of a second sensor pixel circuit included in the sensor pixel circuits; and performing read from the first and second sensor pixel circuits in a line sequential manner during a period other than the sensing period when the light source is turned on and the sensing period when the light source is turned off.

Effects of the Invention

According to the first or fifteenth aspect of the present invention, it is possible to detect the amount of light when the light source is turned on and the amount of light when the light source is turned off separately by use of the sensor pixel circuits of two types, and to obtain a difference between the two amounts of light at the outside of the sensor pixel circuit. Thus, it is possible to provide an input function which does not depend on light environments. Moreover, as compared with the case of detecting two types of amounts of light sequentially by use of one sensor pixel circuit, it is possible to reduce a frequency of the read from the sensor pixel circuits, to retard the read speed, and to reduce power consumption in the device. Moreover, by performing the read from the sensor pixel circuits during the period other than the sensing period, it is possible to increase the degree of freedom for setting turn-on and turn-off timings of the light source as well as reset and read timings of the sensor pixel circuits. Moreover, all the first sensor pixel circuits sense light during the sensing period when the light source is turned on, and all the second sensor pixel circuits sense light during the sensing period when the light source is turned off. Accordingly, in case of setting the sensing period when the light source is turned on and the sensing period when the light source is turned off in proximity to each other, it is possible to eliminate a deviation between the two types of sensing periods, and to prevent followability to motion input from varying in accordance with a direction of the input.

According to the second aspect of the present invention, it is possible to attain the effects described above with regard to the display device, in which the light source is turned on once for a predetermined time in the one-frame period and the sensing period when the light source is turned on and the sensing period when the light source is turned off are set once, respectively, in a one-frame period.

According to the third aspect of the present invention, by performing the reset for the sensor pixel circuits at the start of each sensing period, it is possible to accurately detect the amount of light in each sensor pixel circuit. Moreover, by collectively performing the reset for the sensor pixel circuits which are equal in type to one another, it is possible to cause the sensor pixel circuits, which are equal in type to one another, sense light in the same period. Moreover, it is possible to shorten a time required for the reset, and to increase the degree of freedom for setting the read timing.

According to the fourth aspect of the present invention, by setting the sensing period when the light source is turned on in proximity to the sensing period when the light source is turned off, it is possible to eliminate a deviation between two types of sensing periods, and to prevent followability to motion input from varying in accordance with a direction of the input. Moreover, by setting the sensing period when the light source is turned on immediately after the sensing period when the light source is turned off, it is possible to turn the light source on in the entire sensing period when the light source is turned on, and to enhance the detection accuracy, even in the case where the used light source takes much time for turn-on rather than turn-off.

According to the fifth aspect of the present invention, by setting the sensing period when the light source is turned off in proximity to the sensing period when the light source is turned on, it is possible to eliminate a deviation between the two types of sensing periods, and to prevent followability to motion input from varying in accordance with a direction of the input. Moreover, by setting the sensing period when the light source is turned off immediately after the sensing period when the light source is turned on, it is possible to suppress a detection error resulting from leakage of light in the switching element included in the sensor pixel circuit.

According to the sixth aspect of the present invention, by detecting the amount of light when the light source is turned on and the amount of light when the light source is turned off, with regard to the periods which are equal in length to each other, it is possible to accurately obtain a difference between the amount of light when the light source is turned on and the amount of light when the light source is turned off.

According to the seventh aspect of the present invention, by connecting the first and second sensor pixel circuits to the different output lines depending on the type, it is possible to perform the read from the sensor pixel circuits of two types in parallel, to retard the read speed and to reduce power consumption in the device. Moreover, in case of reading the two types of amounts of light in parallel and then immediately obtaining the difference between the two amounts of light, it becomes unnecessary to provide a memory which is required in the case of detecting two types of amounts of light sequentially and is used for storing the amount of light sensed firstly.

According to the eighth aspect of the present invention, by providing the difference circuit that obtains the difference between the output signal from the first sensor pixel circuit and the output signal from the second sensor pixel circuit, it is possible to immediately obtain the difference between the amount of light to be incident when the light source is turned on and the amount of light to be incident when the light source is turned off, and to eliminate the need for a memory that stores the amount of light sensed firstly.

According to the ninth aspect of the present invention, the retention switching element that turns on during the designated sensing period is provided on the path for the current flowing through the optical sensor. Thus, it is possible to constitute the first sensor pixel circuit that senses light during the sensing period when the light source is turned on and retains the amount of sensed light otherwise, and the second sensor pixel circuit that senses light during the sensing period when the light source is turned off and retains the amount of sensed light otherwise. It is possible to obtain the difference between the amount of light when the light source is turned on and the amount of light when the light source is turned off, at the outside of the sensor pixel circuits, based on the output signals from these sensor pixel circuits.

According to the tenth aspect of the present invention, the retention switching element is provided between the optical sensor and the accumulation node. Thus, it is possible to constitute the sensor pixel circuit that senses light during the designated sensing period and retains the amount of sensed light otherwise. By use of this, it is possible to constitute the first sensor pixel circuit that detects an amount of light when the light source is turned on and the second sensor pixel circuit that detects an amount of light when the light source is turned off.

According to the eleventh aspect of the present invention, the retention switching elements are provided on the two sides of the optical sensor. Thus, it is possible to constitute the sensor pixel circuit that senses light during the designated sensing period and retains the amount of sensed light otherwise. By use of this, it is possible to constitute the first sensor pixel circuit that detects an amount of light when the light source is turned on and the second sensor pixel circuit that detects an amount of light when the light source is turned off. Moreover, during the period other than the sensing period, the second retention switching element provided between the optical sensor and the reset line turns off. Therefore, it is possible to reduce a variation in the potential at the terminal, which is on the side of the first retention switching element, of the optical sensor caused by a current flowing through the optical sensor, and to reduce a difference between potentials to be applied to the two ends of the first retention switching element. Thus, it is possible to reduce a leakage current flowing through the first retention switching element, to prevent a variation in the potential at the accumulation node, and to enhance detection accuracy.

According to the twelfth or thirteenth aspect of the present invention, by causing the sensor pixel circuits of two types share the one optical sensor, it is possible to cancel an influence of a variation in sensitivity characteristics of the optical sensor, and to accurately obtain the difference between the amount of light when the light source is turned on and the amount of light when the light source is turned off. Moreover, it is possible to reduce the number of optical sensors, to increase an aperture ratio, and to enhance the sensitivity of the sensor pixel circuit.

According to the fourteenth aspect of the present invention, by causing the sensor pixel circuits of two types share the one read transistor, it is possible to cancel an influence of a variation in threshold value characteristics of the read transistor, and to accurately obtain the difference between the amount of light when the light source is turned on and the amount of light when the light source is turned off.

BRIEF DESCRIPTION OF THE DRAWINGS

FIG. 10 is a diagram showing operations of the sensor pixel circuit shown in FIG. 9.

FIG. 11 is a circuit diagram of a sensor pixel circuit according to a third embodiment of the present invention.

MODES FOR CARRYING OUT THE INVENTION

Figure 1:
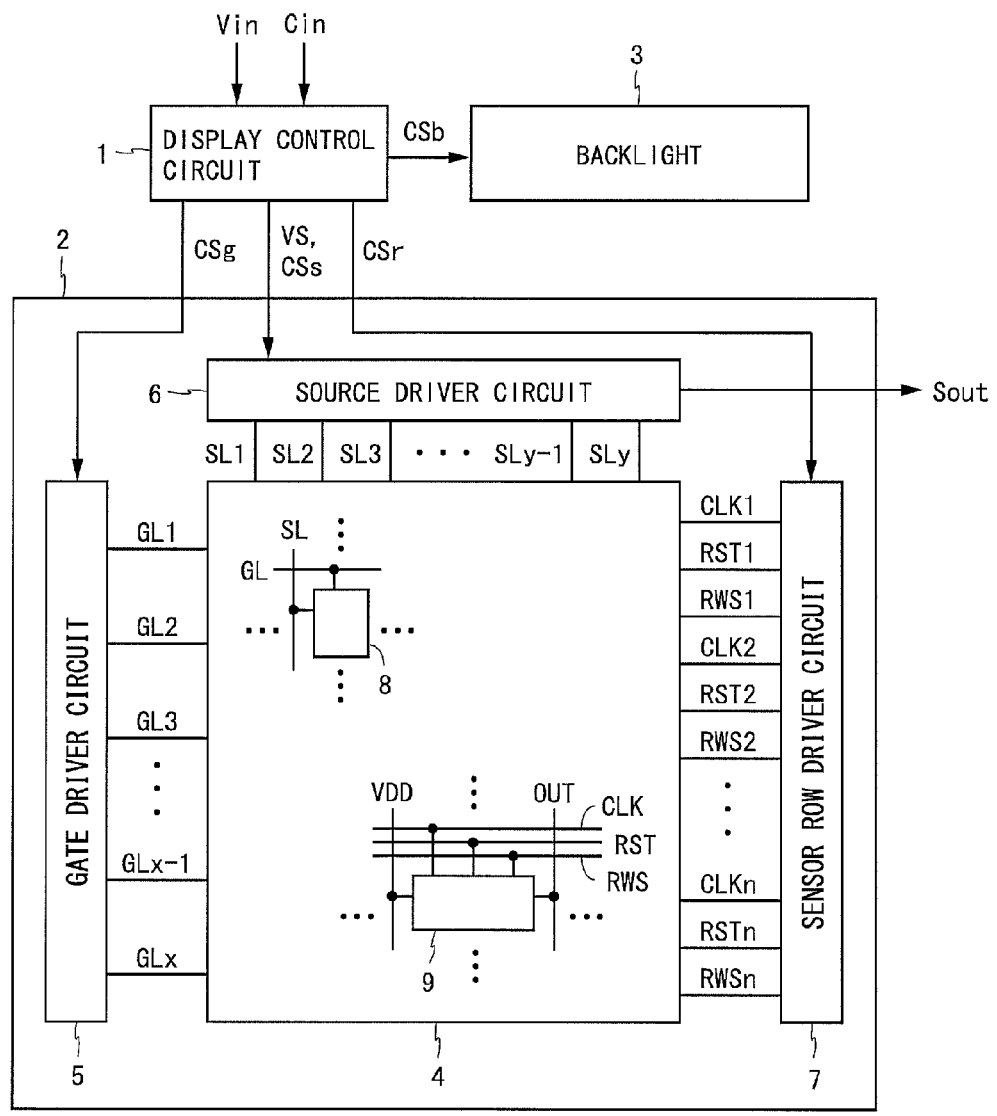
FIG. 1 is a block diagram showing a configuration of a display device according to one embodiment of the present invention.

FIG. 1 is a block diagram showing a configuration of a display device according to one embodiment of the present invention. As shown in FIG. 1, the display device includes a display control circuit 1, a display panel 2 and a backlight 3. The display panel 2 includes a pixel region 4, a gate driver circuit 5, a source driver circuit 6 and a sensor row driver circuit 7. The pixel region 4 includes a plurality of display pixel circuits 8 and a plurality of sensor pixel circuits 9. This display device has a function of displaying an image on the display panel 2, and a function of sensing light incident on the display panel 2. In the following definition, "x" represents an integer of not less than 2, "y" represents a multiple of 3, "m" and "n" each represent an even number, and a frame rate of the display device is 60 frames per second.

To the display device shown in FIG. 1, a video signal Vin and a timing control signal Cin are supplied from the outside. Based on these signals, the display control circuit 1 outputs a video signal VS and control signals CSg, CSs and CSr to the display panel 2, and outputs a control signal CSb to the backlight 3. The video signal VS may be equal to the video signal Vin, or may be a signal corresponding to the video signal Vin subjected to signal processing.

The backlight 3 is a light source for irradiating light to the display panel 2. More specifically, the backlight 3 is provided on a back side of the display panel 2, and irradiates light to the back of the display panel 2. The backlight 3 is turned on when the control signal CSb is in a HIGH level, and is turned off when the control signal CSb is in a LOW level.

In the pixel region 4 of the display panel 2, the (x×y) display pixel circuits 8 and the (n×m/2) sensor pixel circuits 9 are arranged in a two-dimensional array, respectively. More specifically, "x" gate lines GL1 to GLx and "y" source lines SL1 to SLy are formed in the pixel region 4. The gate lines GL1 to GLx are arranged in parallel to one another, and the source lines SL1 to SLy are arranged in parallel to one another so as to be orthogonal to the gate lines GL1 to GLx. The (x×y) display pixel circuits 8 are arranged in the vicinity of intersections between the gate lines GL1 to GLx and the source lines SL1 to SLy. Each display pixel circuit 8 is connected to one gate line GL and one source line SL. The display pixel circuits 8 are classified into those for red display, those for green display and those for blue display. These three types of display pixel circuits 8 are arranged and aligned in an extending direction of the gate lines GL1 to GLx to form one color pixel.

In the pixel region 4, "n" clock lines CLK1 to CLKn, "n" reset lines RST1 to RSTn and "n" read lines RWS1 to RWSn are formed in parallel to the gate lines GL1 to GLx. Moreover, in the pixel region 4, other signal lines and power supply lines (not shown) are formed in parallel to the gate lines GL1 to GLx in some cases. In the case where read from the sensor pixel circuits 9 is performed, "m" source lines selected from among the source lines SL1 to SLy are used as power supply lines VDD1 to VDDm, and different "m" source lines are used as output lines OUT1 to OUTm.

Figure 2:
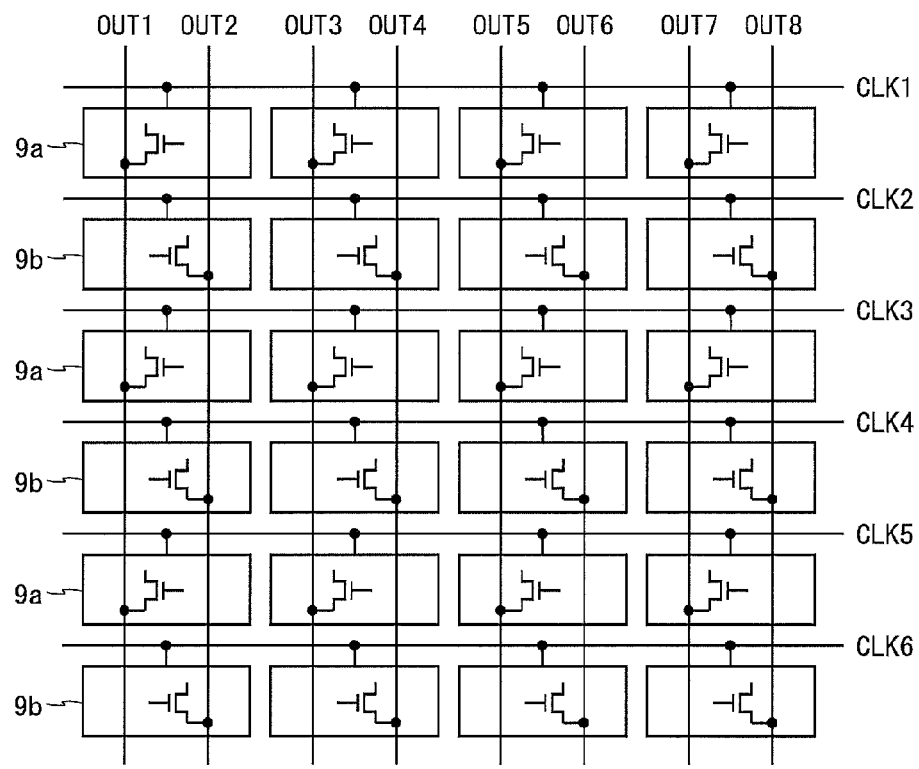
FIG. 2 is a diagram showing an arrangement of sensor pixel circuits on a display panel included in the display device shown in FIG. 1.

FIG. 2 is a diagram showing an arrangement of the sensor pixel circuits 9 in the pixel region 4. The (n×m/2) sensor pixel circuits 9 include first sensor pixel circuits 9a each sensing light to be incident during a turn-on period of the backlight 3 and second sensor pixel circuits 9b each sensing light to be incident during a turn-off period of the backlight 3. The first sensor pixel circuits 9a are equal in number to the second sensor pixel circuits 9b. In FIG. 2, the (n×m/4) first sensor pixel circuits 9a are arranged in the vicinity of intersections between the odd-numbered clock lines CLK1 to CLKn−1 and the odd-numbered output lines OUT1 to OUTm−1. The (n×m/4) second sensor pixel circuits 9b are arranged in the vicinity of intersections between the even-numbered clock lines CLK2 to CLKn and the even-numbered output lines OUT2 to OUTm. As described above, the display panel 2 includes the plurality of output line OUT1 to OUTm for propagating output signals from the first sensor pixel circuits 9a and output signals from the second sensor pixel circuits 9b, and the first sensor pixel circuit 9a and the second sensor pixel circuit 9b are connected to the different output lines depending on the type.

The gate driver circuit 5 drives the gate lines GL1 to GLx. More specifically, based on the control signal CSg, the gate driver circuit 5 selects one gate line sequentially from among the gate lines GL1 to GLx, applies a HIGH-level potential to the selected gate line, and applies a LOW-level potential to the remaining gate lines. Thus, the "y" display pixel circuits 8 connected to the selected gate line are selected collectively.

The source driver circuit 6 drives the source lines SL1 to SLy. More specifically, based on the control signal CSs, the source driver circuit 6 applies potentials corresponding to the video signal VS to the source lines SL1 to SLy. Herein, the source driver circuit 6 may perform line sequential drive, or may perform dot sequential drive. The potentials applied to the source lines SL1 to SLy are written to the "y" display pixel circuits 8 selected by the gate driver circuit 5. As described above, it is possible to write the potentials corresponding to the video signal VS to all the display pixel circuits 8 by use of the gate driver circuit 5 and the source driver circuit 6, thereby displaying a desired image on the display panel 2.

The sensor row driver circuit 7 drives the clock lines CLK1 to CLKn, the reset lines RST1 to RSTn, the read lines RWS1 to RWSn, and the like. More specifically, in the display device according to this embodiment, a sensing period when the backlight is turned on and a sensing period when the backlight is turned off are set once, respectively, in a one-frame period (the details will be described later). The sensor row driver circuit 7 applies a HIGH-level potential to the odd-numbered clock lines CLK1 to CLKn−1 during the sensing period when the backlight is turned on, and applies a HIGH-level potential to the even-numbered clock lines CLK2 to CLKn during the sensing period when the backlight is turned off. Moreover, the sensor row driver circuit 7 applies a HIGH-level potential to the odd-numbered reset lines RST1 to RSTn−1 at the start of the sensing period when the backlight is turned on, and applies a HIGH-level potential to the even-numbered reset lines RST2 to RSTn at the start of the sensing period when the backlight is turned off. Thus, the (n×m/4) sensor pixel circuits 9 connected to the reset lines applied with the HIGH-level potential are reset collectively.

Moreover, based on the control signal CSr, the sensor row driver circuit 7 selects adjacent two read lines sequentially from among the read lines RWS1 to RWSn, applies a HIGH-level potential for read to the selected read lines, and applies a LOW-level potential to the remaining read lines. Thus, the "m" sensor pixel circuits 9 connected to the selected two read lines turn to a readable state collectively. Herein, the source driver circuit 6 applies a HIGH-level potential to the power supply lines VDD1 to VDDm. Thus, the "m" sensor pixel circuits 9 in the readable state output signals corresponding to amounts of light sensed in the respective sensor pixel circuits 9 (hereinafter, referred to as sensor signals) to the output lines OUT1 to OUTm.

The source driver circuit 6 includes a difference circuit (not shown) that obtains a difference between the output signal from the first sensor pixel circuit 9a and the output signal from the second sensor pixel circuit 9b. The source driver circuit 6 amplifies differences between amounts of light obtained by the difference circuit, and outputs the amplified signals as a sensor output Sout to the outside of the display panel 2. As described above, by reading the sensor signals from all the sensor pixel circuits 9 by use of the source driver circuit 6 and the sensor row driver circuit 7, it is possible to sense light incident on the display panel 2. The display device shown in FIG. 1 performs one-time drive to be described below, in order to sense light incident on the display panel 2.

Figure 3:
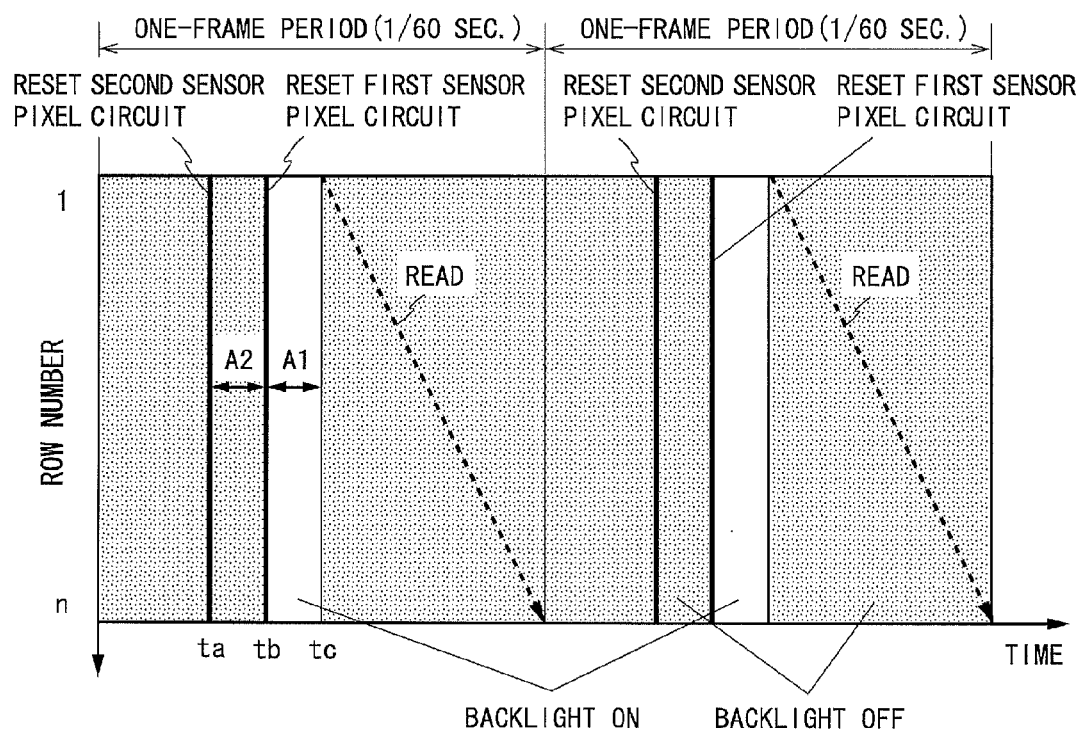
FIG. 3 is a diagram showing turn-on and turn-off timings of a backlight as well as reset and read timings of the sensor pixel circuits, in the display device shown in FIG. 1.

FIG. 3 is a diagram showing turn-on and turn-off timings of the backlight 3 as well as reset and read timings of the sensor pixel circuits 9. As shown in FIG. 3, the backlight 3 is turned on once for a predetermined time in a one-frame period and is turned off during the remaining period. More specifically, the backlight 3 is turned on at a time tb and is turned off at a time tc in the one-frame period. Moreover, reset for all the first sensor pixel circuits 9a is performed at the time tb, and reset for all the second sensor pixel circuits 9b is performed at a time ta.

The first sensor pixel circuit 9a senses light to be incident during a period A1 from the time tb to the time tc (a turn-on period of the backlight 3). The second sensor pixel circuit 9b senses light to be incident during a period A2 from the time ta to the time tb (a turn-off period of the backlight 3). The period A1 is equal in length to the period A2. Read from the first sensor pixel circuits 9a and read from the second sensor pixel circuits 9b are performed in parallel in a line sequential manner after the time tc. It is to be noted that, in FIG. 3, the read from the sensor pixel circuits 9 is completed within the one-frame period; however, the read may be completed until the reset for the second sensor pixel circuits 9b is started in a next frame period.

Figure 4:
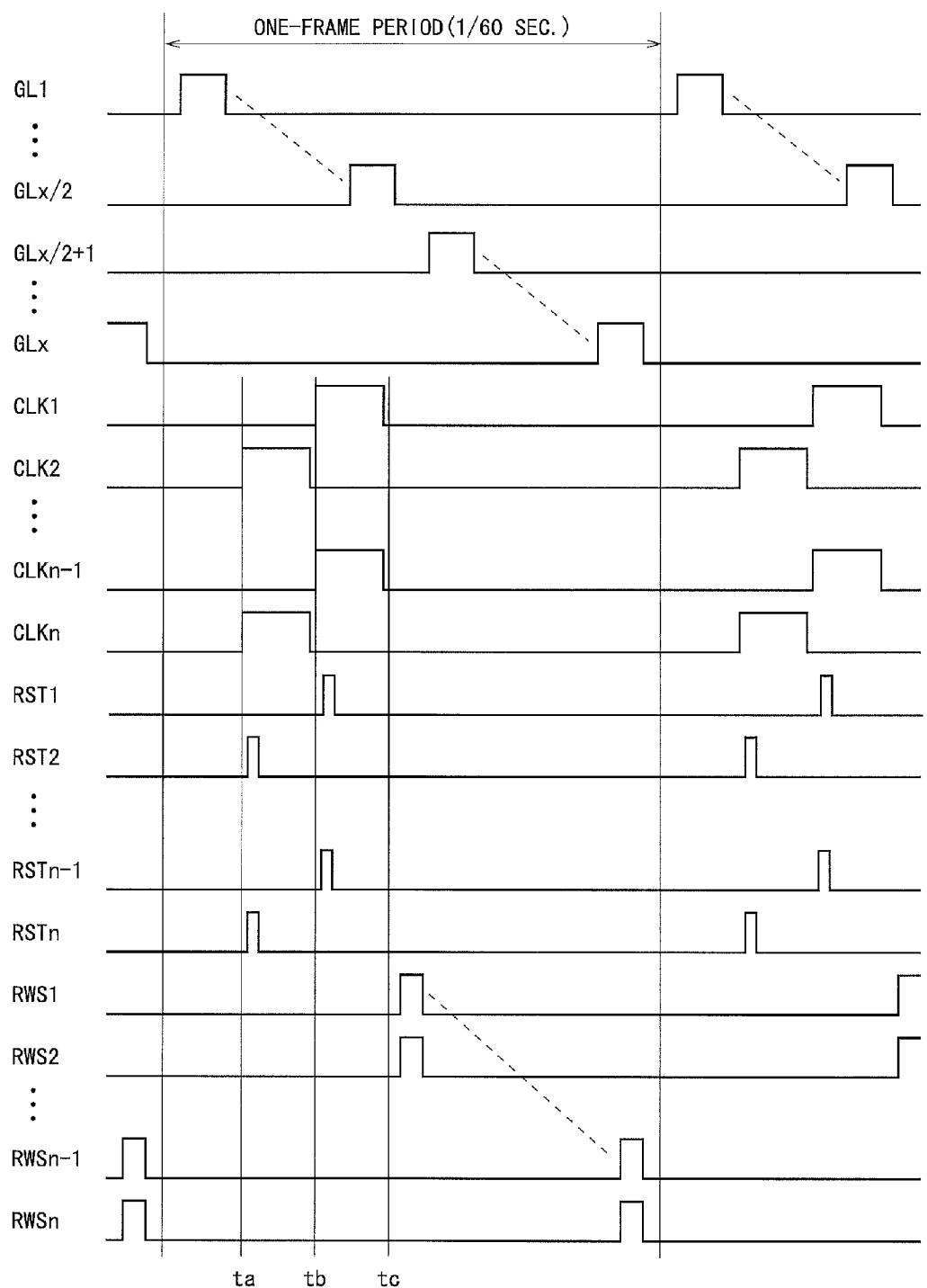
FIG. 4 is a signal waveform diagram of the display panel included in the display device shown in FIG. 1.

FIG. 4 is a signal waveform diagram of the display panel 2. As shown in FIG. 4, potentials at the gate lines GL1 to GLx sequentially turn to the HIGH level once for a predetermined time in a one-frame period. Potentials at the odd-numbered clock lines CLK1 to CLKn−1 turn to the HIGH level once during the period A1 (more specifically, from the time tb to a time which is slightly before the time tc) in the one-frame period. Potentials at the even-numbered clock lines CLK2 to CLKn turn to the HIGH level once during the period A2 (more specifically, from the time ta to a time which is slightly before the time tb) in the one-frame period. Potentials at the odd-numbered reset lines RST1 to RSTn−1 turn to the HIGH level once for a predetermined time in the beginning of the period A1 in the one-frame period. Potentials at the even-numbered reset lines RST2 to RSTn turn to the HIGH level once for a predetermined time in the beginning of the period A2 in the one-frame period. The read lines RWS1 to RWSn are provided in twos, and potentials at the (n/2) pairs of read lines sequentially turn to the HIGH level for a predetermined time after the time tc.

Figure 5:
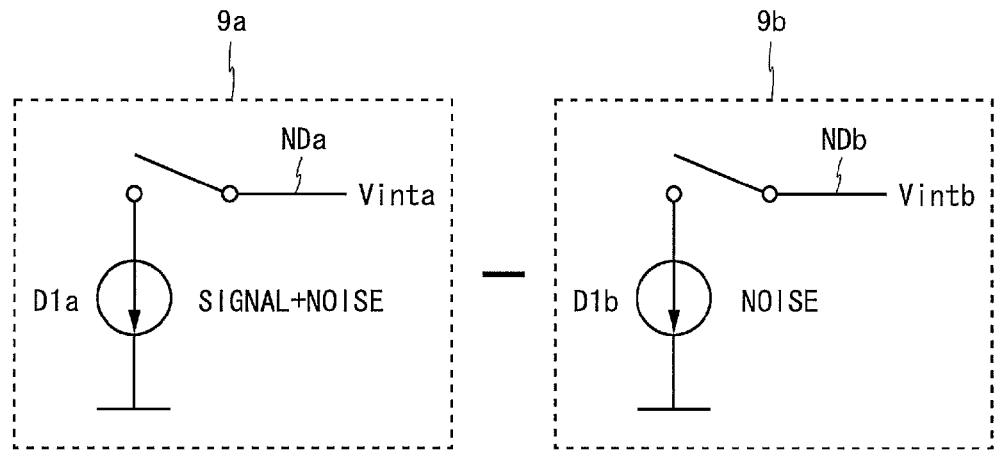
FIG. 5 is a diagram showing schematic configurations of the sensor pixel circuits included in the display device shown in FIG. 1.

FIG. 5 is a diagram showing schematic configurations of the sensor pixel circuits 9. As shown in FIG. 5, the first sensor pixel circuit 9a includes one photodiode D1a and one accumulation node NDa. The photodiode D1a pulls out, of the accumulation node NDa, charge corresponding to an amount of light to be incident while the backlight 3 is turned on (which corresponds to (signal+noise)). As in the first sensor pixel circuit 9a, the second sensor pixel circuit 9b includes one photodiode D1b and one accumulation node NDb. The photodiode D1b pulls out, of the accumulation node NDb, charge corresponding to an amount of light to be incident while the backlight 3 is turned off (which corresponds to noise). Each of the first sensor pixel circuit 9a and the second sensor pixel circuit 9b retains an amount of sensed light during a period other than the designated sensing period. A sensor signal corresponding to the amount of light to be incident during the sensing period when the backlight 3 is turned on is read from the first sensor pixel circuit 9a. A sensor signal corresponding to the amount of light to be incident during the sensing period when the backlight 3 is turned off is read from the second sensor pixel circuit 9b. By obtaining the difference between the output signal from the first sensor pixel circuit 9a and the output signal from the second sensor pixel circuit 9b, using the difference circuit included in the source driver circuit 6, it is possible to obtain the difference between the amount of light when the backlight is turned on and the amount of light when the backlight is turned off.

It is to be noted that the number of sensor pixel circuits 9 to be provided in the pixel region 4 may be arbitrary. However, it is preferable that the first sensor pixel circuits 9a and the second sensor pixel circuits 9b are connected to the different output lines. For example, in the case where the (n×m) sensor pixel circuits 9 are provided in the pixel region 4, the "n" first sensor pixel circuits 9a may be connected to the odd-numbered output lines OUT1 to OUTm−1, and "n" second sensor pixel circuits 9b may be connected to the even-numbered output lines OUT2 to OUTm. In this case, the read from the sensor pixel circuits 9 is performed for each row. Alternatively, the sensor pixel circuits 9 the number of which is equal to that of color pixels (that is, (x×y/3)) may be provided in the pixel region 4. Alternatively, the sensor pixel circuits 9 the number of which is smaller than that of color pixels (for example, one severalth to one several tenth of color pixels) may be provided in the pixel region 4.

As described above, the display device according to the embodiment of the present invention is the display device in which the plurality of photodiodes (optical sensors) are arranged in the pixel region 4. The display device includes the display panel 2 that includes the plurality of display pixel circuits 8 and the plurality of sensor pixel circuits 9, the backlight 3 that is turned on once for the predetermined time in the one-frame period, and the sensor row driver circuit 7 (drive circuit) that outputs, to the sensor pixel circuits 9, the odd-numbered clock signals CLK1 to CLKn−1 (first control signals) each indicating the sensing period when the backlight is turned on and the even-numbered clock signals CLK2 to CLKn (second control signals) each indicating the sensing period when the backlight is turned off and performs the reset for and read from the sensor pixel circuits 9. The sensor pixel circuits 9 include the first sensor pixel circuits 9a that sense light during the sensing period when the backlight is turned on and retain the amount of sensed light otherwise in accordance with the odd-numbered clock signal CLK1 to CLKn−1, and the second sensor pixel circuits 9b that sense light during the sensing period when the backlight is turned off and retain the amount of sensed light otherwise in accordance with the even-numbered clock signals CLK2 to CLKn. During the period other than the sensing period when the backlight is turned on and the sensing period when the backlight is turned off, the sensor row driver circuit 7 performs the read from the first sensor pixel circuits 9a and the read from the second sensor pixel circuits 9b in a line sequential manner.

The display device according to this embodiment is allowed to detect the amount of light when the backlight is turned on and the amount of light when the backlight is turned off separately, by use of the sensor pixel circuits of two types, and to obtain the difference between the two amounts of light at the outside of the sensor pixel circuit. Thus, it is possible to give an input function which does not depend on light environments. Moreover, as compared with the case of detecting two types of amounts of light sequentially by use of one sensor pixel circuit, it is possible to reduce a frequency of the read from the sensor pixel circuits, to retard the read speed, and to reduce power consumption in the device. Moreover, by performing the read from the sensor pixel circuits during the period other than the sensing period, it is possible to increase the degree of freedom for setting the turn-on and turn-off timings of the backlight as well as the reset and read timings of the sensor pixel circuits.

Moreover, the sensor row driver circuit 7 performs the reset for the first sensor pixel circuits 9a at the start of the sensing period when the backlight is turned on, and performs the reset for the second sensor pixel circuits 9b at the start of the sensing period when the backlight is turned off. As described above, by performing the reset for the sensor pixel circuits at the start of each sensing period, it is possible to accurately detect the amount of light in each sensor pixel circuit. Moreover, by collectively performing the reset for the sensor pixel circuits of the same type, it is possible to cause the sensor pixel circuits of the same type sense light in the same period. Moreover, it is possible to shorten a time required for the reset, and to increase the degree of freedom for setting the read timing.

Moreover, the sensing period when the backlight is turned on (A1 shown in FIG. 3) is set immediately after the sensing period when the backlight is turned off (A2 shown in FIG. 3). As described above, by setting the two types of sensing periods in proximity to each other, it is possible to eliminate a deviation between the two types of sensing periods, and to prevent followability to motion input from varying in accordance with a direction of the input. Moreover, by setting the sensing period when the backlight is turned on immediately after the sensing period when the backlight is turned off, it is possible to turn the backlight 3 on in the entire sensing period when the backlight is turned on, and to enhance the detection accuracy, even in the case where the used backlight takes much time for turn-on rather than turn-off. Moreover, by setting the two types of sensing periods to be equal in length to each other, it is possible to detect the amount of light when the backlight is turned on and the amount of light when the backlight is turned off with regard to the periods which are equal in length to each other, and to accurately obtain the difference between the amount of light when the backlight is turned on and the amount of light when the backlight is turned off.

Moreover, the display panel 2 further includes the plurality of output lines OUT1 to OUTm for propagating the output signals from the first and second sensor pixel circuits 9a and 9b. The first sensor pixel circuit 9a and the second sensor pixel circuit 9b are connected to the different output lines. The sensor row driver circuit 7 performs the read from the first sensor pixel circuit 9a and the read from the second sensor pixel circuit 9b in parallel. The source driver circuit 6 includes the difference circuit that obtains the difference between the output signal from the first sensor pixel circuit 9a and the output signal from the second sensor pixel circuit 9b. As described above, by connecting the first and second sensor pixel circuits 9a and 9b to the different output lines depending on the type and performing the read from the sensor pixel circuits of two types in parallel, it is possible to retard the read speed and to reduce power consumption in the device. Moreover, by providing the difference circuit described above, it is possible to immediately obtain the difference between the amount of light to be incident when the backlight is turned on and the amount of light to be incident when the backlight is turned off, and to eliminate the need for a memory for storing the amount of light sensed firstly.

Hereinafter, description will be given of details of the sensor pixel circuit 9 included in the display device according to this embodiment. In the following description, a sensor pixel circuit is simply referred to as a pixel circuit, and a signal on a signal line is designated using the designation of the signal line for the sake of identification (for example, a signal on a clock line CLKa is referred to as a clock signal CLKa). In first, second, sixth and seventh embodiments, the first sensor pixel circuit 9a is connected to a clock line CLKa, a reset line RSTa, a read line RWSa, a power supply line VDDa and an output line OUTa. The second sensor pixel circuit 9b is connected to a clock line CLKb, a reset line RSTb, a read line RWSb, a power supply line VDDb and an output line OUTb. In these embodiments, the second sensor pixel circuit 9b has a configuration which is equal to that of the first sensor pixel circuit 9a and operates as in the first sensor pixel circuit 9a; therefore, the description about the second sensor pixel circuit 9b is omitted appropriately. In third to fifth embodiments, the first sensor pixel circuit 9a and the second sensor pixel circuit 9b share a part of constituent elements so as to be configured as one pixel circuit. The pixel circuit according to each of the third and fourth embodiments is connected to a reset line RST and a read line RWS each formed in common. The pixel circuit according to the fifth embodiment is connected to a reset line RST, a read line RWS, a power supply line VDD and an output line OUT each formed in common.

(First Embodiment)

Figure 6:
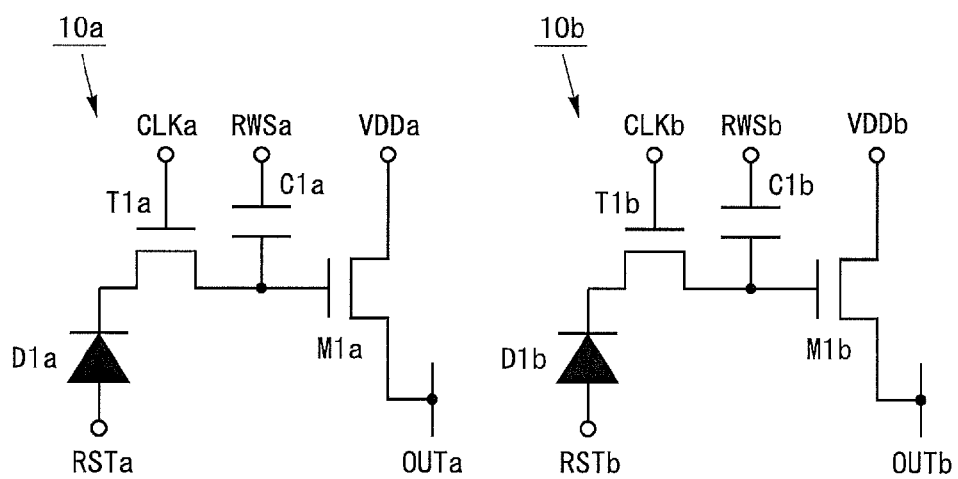
FIG. 6 is a circuit diagram of sensor pixel circuits according to a first embodiment of the present invention.

FIG. 6 is a circuit diagram of pixel circuits according to a first embodiment of the present invention. As shown in FIG. 6, a first pixel circuit 10a includes transistors T1a and M1a, a photodiode D1a, and a capacitor C1a. A second pixel circuit 10b includes transistors T1b and M1b, a photodiode D1b, and a capacitor C1b. Each of the transistors T1a, M1a, T1b and M1b is an N-type TFT (Thin Film Transistor).

With regard to the first pixel circuit 10a, in the photodiode D1a, an anode is connected to a reset line RSTa, and a cathode is connected to a source of the transistor T1a. In the transistor T1a, a gate is connected to a clock line CLKa, and a drain is connected to a gate of the transistor M1a. In the transistor M1a, a drain is connected to a power supply line VDDa, and a source is connected to an output line OUTa. The capacitor C1a is provided between the gate of the transistor M1a and a read line RWSa. In the first pixel circuit 10a, a node connected to the gate of the transistor M1a serves as an accumulation node that accumulates charge corresponding to an amount of sensed light, and the transistor M1a functions as a read transistor. The second pixel circuit 10b has a configuration which is equal to that of the first pixel circuit 10a.

Figure 7:
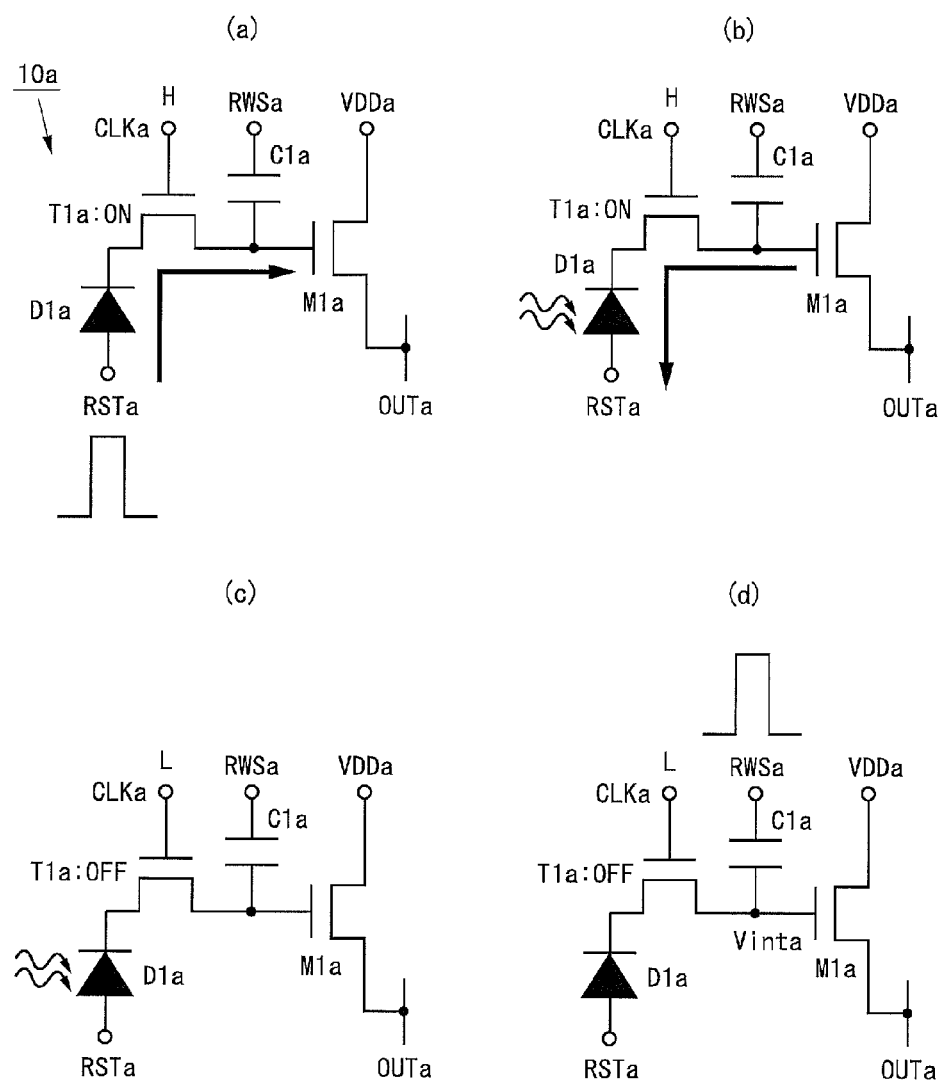
FIG. 7 is a diagram showing operations of the sensor pixel circuit shown in FIG. 6.

FIG. 7 is a diagram showing operations of the first pixel circuit 10a. As shown in FIG. 7, the first pixel circuit 10a performs (a) reset, (b) accumulation, (c) retention, and (d) read, in a one-frame period.

Figure 8:
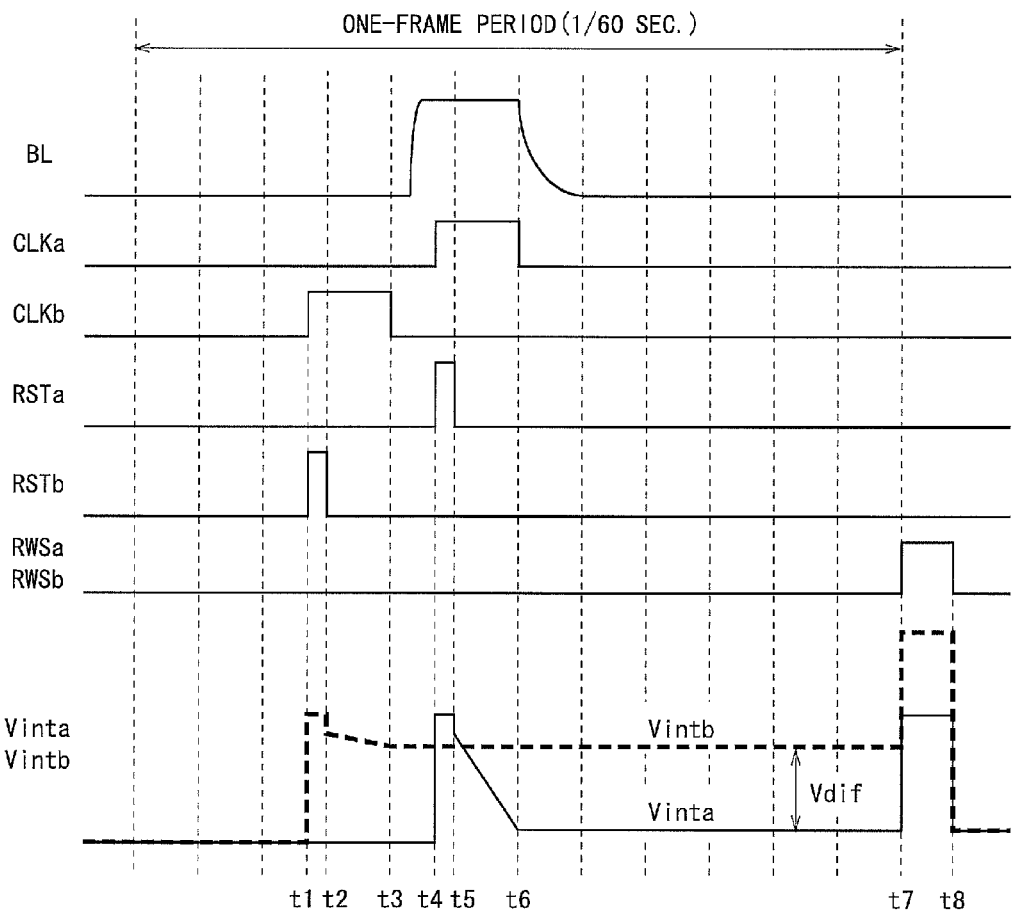
FIG. 8 is a signal waveform diagram of the sensor pixel circuits shown in FIG. 6.

FIG. 8 is a signal waveform diagram of the first pixel circuit 10a and the second pixel circuit 10b. In FIG. 8, BL represents a brightness of the backlight 3, Vinta represents a potential at the accumulation node in the first pixel circuit 10a (a gate potential at the transistor M1a), and Vintb represents a potential at the accumulation node in the second pixel circuit 10b (a gate potential at the transistor M1b). With regard to the first pixel circuit 10a, a reset period corresponds to a range from a time t4 to a time t5, an accumulation period corresponds to a range from the time t5 to a time t6, a retention period corresponds to a range from the time t6 to a time t7, and a read period corresponds to a range from the time t7 to a time t8. With regard to the second pixel circuit 10b, the reset period corresponds to a range from a time t1 to a time t2, the accumulation period corresponds to a range from the time t2 to a time t3, the retention period corresponds to a range from the time t3 to the time t7, and the read period corresponds to a range from the time t7 to the time t8.

In the reset period of the first pixel circuit 10a, a clock signal CLKa turns to a HIGH level, a read signal RWSa turns to a LOW level, and a reset signal RSTa turns to a HIGH level for reset. Herein, the transistor T1a turns on. Accordingly, a current (a forward current in the photodiode D1a) flows from the reset line RSTa into the accumulation node via the photodiode D1a and the transistor T1a (FIG. 7 (a)), and the potential Vinta is reset to a predetermined level.

In the accumulation period of the first pixel circuit 10a, the clock signal CLKa turns to the HIGH level, and the reset signal RSTa and the read signal RWSa turn to the LOW level. Herein, the transistor T1a turns on. Herein, when light is incident on the photodiode D1a, a current (a photocurrent in the photodiode D1a) flows from the accumulation node into the reset line RSTa via the transistor T1a and the photodiode D1a, and charge is pulled out of the accumulation node (FIG. 7 (b)). Accordingly, the potential Vinta drops in accordance with an amount of light to be incident during the period that the clock signal CLKa is in the HIGH level (a turn-on period of a backlight 3).

In the retention period of the first pixel circuit 10a, the clock signal CLKa, the reset signal RSTa and the read signal RWSa turn to the LOW level. Herein, the transistor T1a turns off. Herein, even when light is incident on the photodiode D1a, the transistor T1a is in the OFF state and the photodiode D1a is disconnected electrically from the gate of the transistor M1, so that the potential Vinta does not change (FIG. 7 (c)).

In the read period of the first pixel circuit 10a, the clock signal CLKa and the reset signal RSTa turn to the LOW level, and the read signal RWSa turns to a HIGH level for read. Herein, the transistor T1a turns off. Herein, the potential Vinta rises by an amount which is (Cqa/Cpa) times (Cpa: a capacitance value of the entire first pixel circuit 10a, Cqa: a capacitance value of the capacitor C1a) as large as a rise amount of a potential at the read signal RWSa. The transistor M1a constitutes a source follower amplification circuit having, as a load, a transistor (not shown) included in the source driver circuit 6, and drives the output line OUTa in accordance with the potential Vinta (FIG. 7 (d)).

The second pixel circuit 10b operates as in the first pixel circuit 10a. The potential Vintb is reset to a predetermined level in the reset period, drops in accordance with an amount of light to be incident during the period that the clock signal CLKb is in the HIGH level (a turn-off period of the backlight 3) in the accumulation period, and does not change in the retention period. In the read period, the potential Vintb rises by an amount which is (Cqb/Cpb) times (Cpb: a capacitance value of the entire second pixel circuit 10b, Cqb: a capacitance value of the capacitor C1b) as large as a rise amount of a potential at the read signal RWSb, and the transistor M1b drives the output line OUTb in accordance with the potential Vintb.

As described above, the first pixel circuit 10a according to this embodiment includes the one photodiode D1a (optical sensor), the one accumulation node which accumulates the charge corresponding to the amount of sensed light, the transistor M1a (read transistor) which has the control terminal connected to the accumulation node, and the transistor T1a (retention switching element) which is provided on the path for the current flowing through the photodiode D1a and turns on or off in accordance with the clock signal CLK. The transistor T1a is provided between the accumulation node and one of the ends of the photodiode D1a, and the other end of the photodiode D1a is connected to the reset line RSTa. The transistor T1a turns on during the sensing period when the backlight is turned on, in accordance with the clock signal CLKa. The second pixel circuit 10b has the configuration which is similar to that of the first pixel circuit 10a, and the transistor T1b included in the second pixel circuit 10b turns on during the sensing period when the backlight is turned off.

As described above, the transistor T1a that turns on during the sensing period when the backlight is turned on is provided on the path for the current flowing through the photodiode D1a, and the transistor T1b that turns on during the sensing period when the backlight is turned off is provided on the path for the current flowing through the photodiode D1b. Thus, it is possible to constitute the first pixel circuit 10a that senses light during the sensing period when the backlight is turned on and retains the amount of sensed light otherwise, and the second pixel circuit 10b that senses light during the sensing period when the backlight is turned off and retains the amount of sensed light otherwise.

(Second Embodiment)

Figure 9:
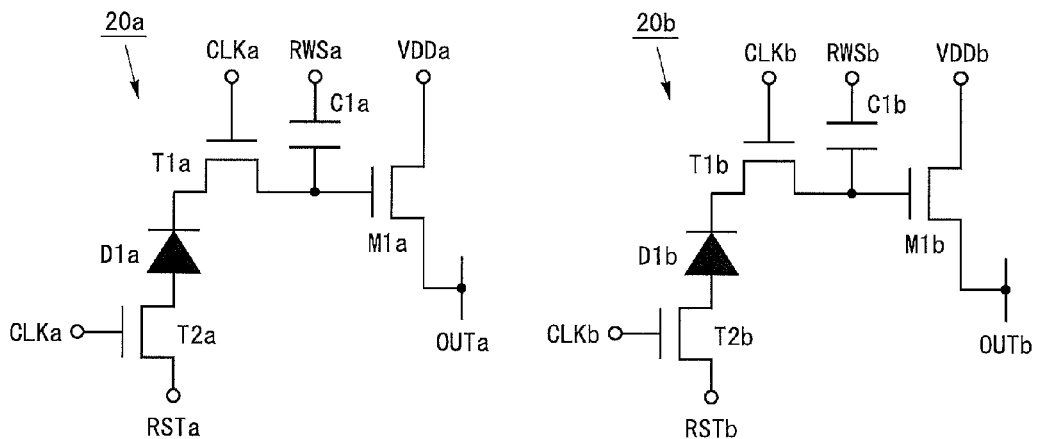
FIG. 9 is a circuit diagram of sensor pixel circuits according to a second embodiment of the present invention.

FIG. 9 is a circuit diagram of pixel circuits according to a second embodiment of the present invention. As shown in FIG. 9, a first pixel circuit 20a includes transistors T1a, T2a and M1a, a photodiode D1a, and a capacitor C1a. A second pixel circuit 20b includes transistors T1b, T2b and M1b, a photodiode D1b, and a capacitor C1b. Each of the transistors T1a, T2a, M1a, T1b, T2b and M1b is an N-type TFT.

With regard to the first pixel circuit 20a, gates of the transistors T1a and T2a are connected to a clock line CLKa. In the transistor T2a, a source is connected to a reset line RSTa, and a drain is connected to an anode of the photodiode D1a. A cathode of the photodiode D1a is connected to a source of the transistor T1a. A drain of the transistor T1a is connected to a gate of the transistor M1a. In the transistor M1a, a drain is connected to a power supply line VDDa, and a source is connected to an output line OUTa. The capacitor C1a is provided between the gate of the transistor M1a and a read line RWSa. In the first pixel circuit 20a, a node connected to the gate of the transistor M1a serves as an accumulation node, and the transistor M1a functions as a read transistor. The second pixel circuit 20b has a configuration which is similar to that of the first pixel circuit 20a.

FIG. 10 is a diagram showing operations of the first pixel circuit 20a. As shown in FIG. 10, the first pixel circuit 20a performs (a) reset, (b) accumulation, (c) retention, and (d) read, in a one-frame period. A signal waveform diagram of the first and second pixel circuits 20a and 20b is equal to that in the first embodiment (FIG. 8). The first pixel circuit 20a operates as in the first pixel circuit 10a according to the first embodiment, except that the transistor T2a turns on or off at a timing which is equal to that of the transistor T1a. Similar things hold true for the second pixel circuit 20b.

As described above, the first pixel circuit 20a according to this embodiment includes the one photodiode D1a (optical sensor), the one accumulation node which accumulates the charge corresponding to the amount of sensed light, the transistor M1a (read transistor) which has the control terminal connected to the accumulation node, and the transistors T1a and T2a (two retention switching elements). The transistor T1a is provided between the accumulation node and one of the ends of the photodiode D1a, and the transistor T2a is provided between the reset line RSTa and the other end of the photodiode D1a. The transistors T1a and T2a turn on during a sensing period when the backlight is turned on, in accordance with the clock signal CLKa. The second pixel circuit 20b has the configuration which is similar to that of the first pixel circuit 20a, and the transistors T1b and T2b included in the second pixel circuit 20b turn on during a sensing period when the backlight is turned off.

As described above, the transistors T1a and T2a that turn on during the sensing period when the backlight is turned on are provided on the two sides of the photodiode D1a, and the transistors T1b and T2b that turn on during the sensing period when the backlight is turned off are provided on the two sides of the photodiode D1b. Thus, it is possible to constitute the first pixel circuit 20a that senses light during the sensing period when the backlight is turned on and retains the amount of sensed light otherwise, and the second pixel circuit 20b that senses light during the sensing period when the backlight is turned off and retains the amount of sensed light otherwise.

Moreover, in the first pixel circuit 20a, the transistor T2a provided between the photodiode D1a and the reset line RSTa turns off during the period other than the sensing period when the backlight is turned on. Therefore, it becomes possible to reduce a variation in a cathode potential at the photodiode D1a because of a current flowing through the photodiode D1a, and to reduce a difference between potentials to be applied to the two ends of the transistor T1a. Thus, it is possible to reduce a leakage current flowing through the transistor T1a, to prevent a variation of a potential at the accumulation node, and to enhance detection accuracy. Also in the second pixel circuit 20b, it is possible to attain similar effects.

(Third Embodiment)

FIG. 11 is a circuit diagram of a pixel circuit according to a third embodiment of the present invention. A pixel circuit 30 shown in FIG. 11 includes transistors T1a, T1b, M1a and M1b, a photodiode D1, and capacitors C1a and C1b. Each of the transistors T1a, T1b, M1a and M1b is an N-type TFT. In FIG. 11, the left half corresponds to a first pixel circuit and the right half corresponds to a second pixel circuit. The pixel circuit 30 is connected to clock lines CLKa and CLKb, a reset line RST, a read line RWS, power supply lines VDDa and VDDb, and output lines OUTa and OUTb.

As shown in FIG. 11, in the photodiode D1, an anode is connected to the reset line RST, and a cathode is connected to sources of the transistors T1a and T1b. In the transistor T1a, a gate is connected to the clock line CLKa, and a drain is connected to a gate of the transistor M1a. In the transistor M1a, a drain is connected to the power supply line VDDa, and a source is connected to the output line OUTa. The capacitor C1a is provided between the gate of the transistor M1a and the read line RWS. In the transistor T1b, a gate is connected to the clock line CLKb and a drain is connected to a gate of the transistor M1b. In the transistor M1b, a drain is connected to the power supply line VDDb, and a source is connected to the output line OUTb. The capacitor C1b is provided between the gate of the transistor M1b and the read line RWS. In the pixel circuit 30, a node connected to the gate of the transistor M1a serves as a first accumulation node, a node connected to the gate of the transistor M1b serves as a second accumulation node, and each of the transistors M1a and M1b functions as a read transistor.

Figure 12:
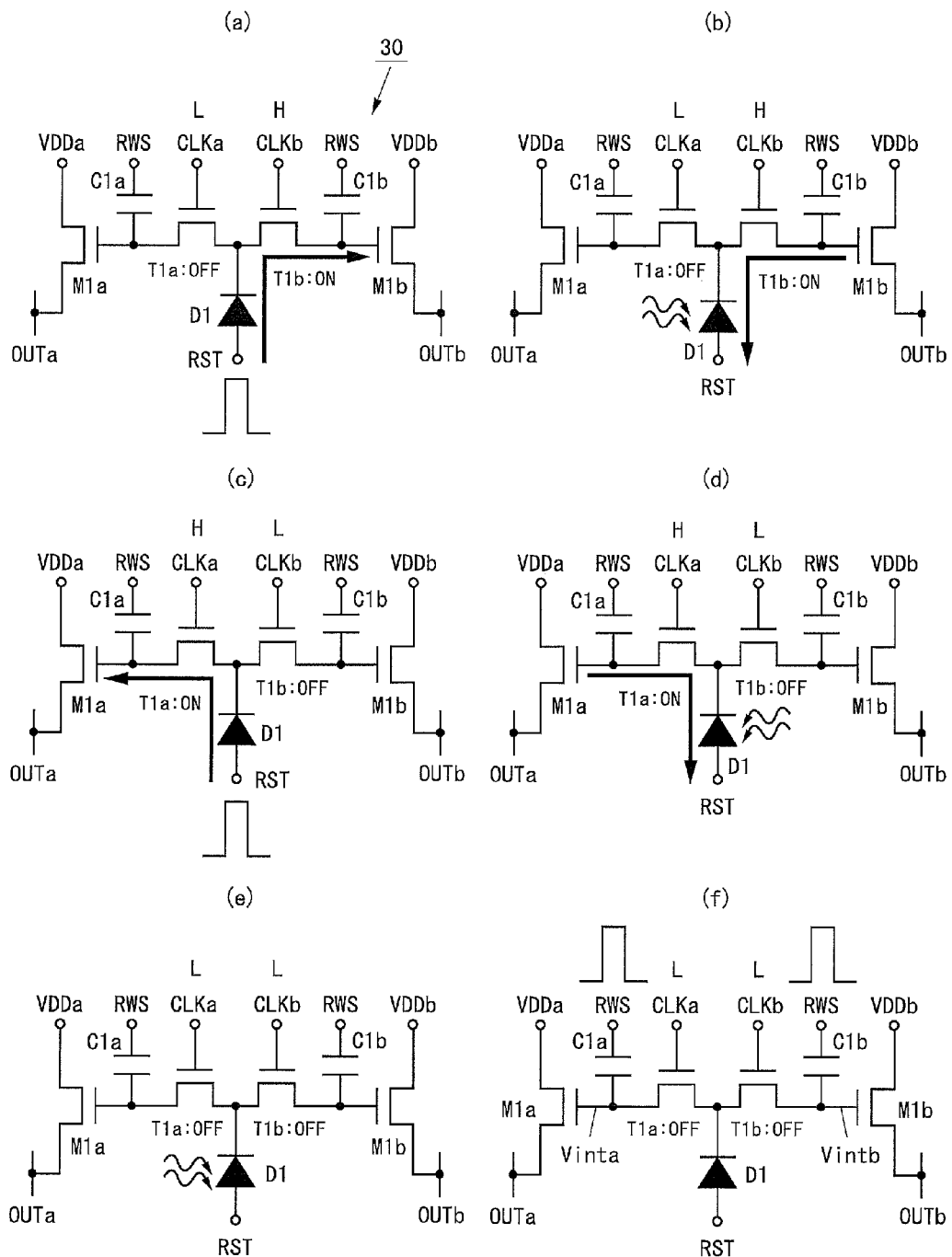
FIG. 12 is a diagram showing operations of the sensor pixel circuit shown in FIG. 11.

FIG. 12 is a diagram showing operations of the pixel circuit 30. As shown in FIG. 12, the pixel circuit 30 performs (a) reset when a backlight is turned off, (b) accumulation when the backlight is turned off, (c) reset when the backlight is turned on, (d) accumulation when the backlight is turned on, (e) retention, and (f) read, in a one-frame period.

Figure 13:
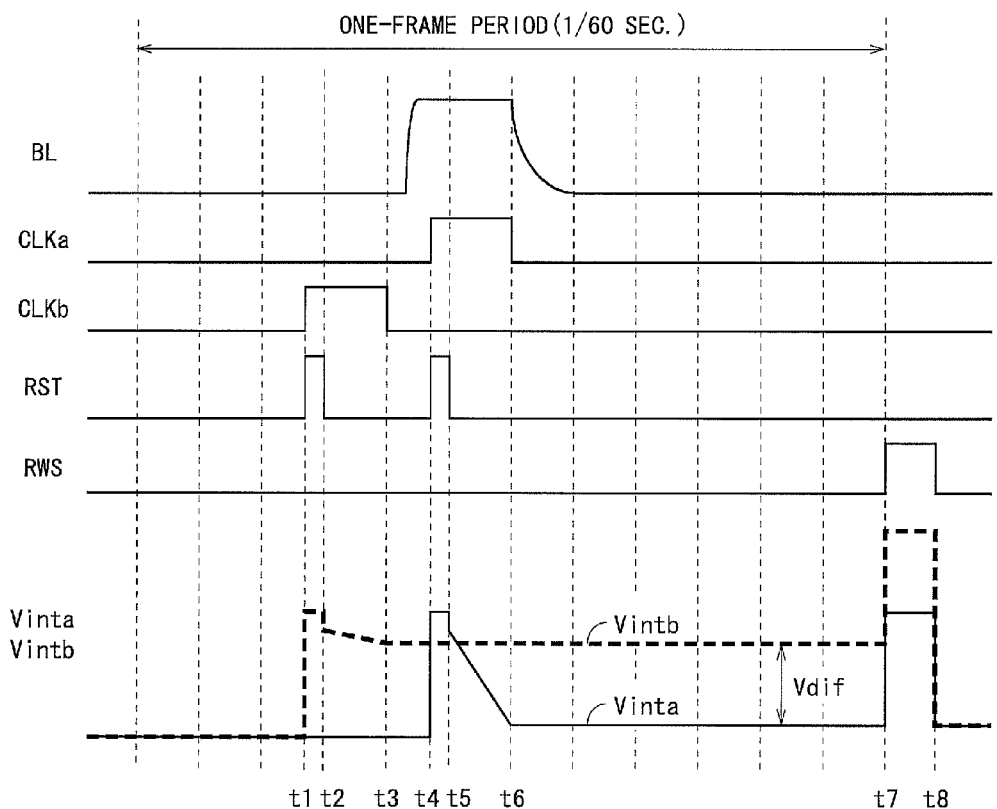
FIG. 13 is a signal waveform diagram of the sensor pixel circuit shown in FIG. 11.

FIG. 13 is a signal waveform diagram of the pixel circuit 30. In FIG. 13, Vinta represents a potential at the first accumulation node (a gate potential at the transistor M1a), and Vintb represents a potential at the second accumulation node (a gate potential at the transistor M1b). In FIG. 13, a reset period when the backlight is turned off corresponds to a range from a time t1 to a time t2, an accumulation period when the backlight is turned off corresponds to a range from the time t2 to a time t3, a reset period when the backlight is turned on corresponds to a range from a time t4 to a time t5, an accumulation period when the backlight is turned on corresponds to a range from the time t5 to a time t6, retention periods correspond to a range from the time t3 to the time t4 and a range from the time t6 to a time t7, and a read period corresponds to a range from the time t7 to a time t8.

In the reset period when the backlight is turned off, a clock signal CLKb turns to a HIGH level, a clock signal CLKa and a read signal RWS turn to a LOW level, and a reset signal RST turns to a HIGH level for reset. Herein, the transistor T1a turns off, and the transistor T1b turns on. Accordingly, a current (a forward current in the photodiode D1) flows from the reset line RST into the second accumulation node via the photodiode D1 and the transistor T1b (FIG. 12 (a)), and the potential Vintb is reset to a predetermined level.

In the accumulation period when the backlight is turned off, the clock signal CLKb turns to the HIGH level, and the clock signal CLKa, the reset signal RST and the read signal RWS turn to the LOW level. Herein, the transistor T1a turns off, and the transistor T1b turns on. Herein, when light is incident on the photodiode D1, a current (a photocurrent in the photodiode D1) flows from the second accumulation node into the reset line RST via the transistor T1b and the photodiode D1, and charge is pulled out of the second accumulation node (FIG. 12 (b)). Accordingly, the potential Vintb drops in accordance with an amount of light to be incident during this period (a turn-off period of the backlight 3). It is to be noted that the potential Vinta does not change during this period.

In the reset period when the backlight is turned on, the clock signal CLKa turns to the HIGH level, the clock signal CLKb and the read signal RWS turn to the LOW level, and the reset signal RST turns to a HIGH level for reset. Herein, the transistor T1a turns on, and the transistor T1b turns off. Accordingly, a current (a forward current in the photodiode D1) flows from the reset line RST into the first accumulation node via the photodiode D1 and the transistor T1a (FIG. 12 (c)), and the potential Vinta is reset to a predetermined level.

In the accumulation period when the backlight is turned on, the clock signal CLKa turns to the HIGH level, and the clock signal CLKb, the reset signal RST and the read signal RWS turn to the LOW level. Herein, the transistor T1a turns on, and the transistor T1b turns off. Herein, when light is incident on the photodiode D1, a current (a photocurrent in the photodiode D1) flows from the first accumulation node into the reset line RST via the transistor T1a and the photodiode D1, and charge is pulled out of the first accumulation node (FIG. 12 (d)). Accordingly, the potential Vinta drops in accordance with an amount of light to be incident during this period (a turn-on period of the backlight 3). It is to be noted that the potential Vintb does not change during this period.

In the retention period, the clock signals CLKa and CLKb, the reset signal RST and the read signal RWS turn to the LOW level. Herein, the transistors T1a and T1b turn off. Herein, even when light is incident on the photodiode D1, the transistors T1a and T1b are in the OFF state and the photodiode D1 is disconnected electrically from the gates of the transistors M1a and M1b, so that the potentials Vinta and Vintb do not change (FIG. 12 (e)).

In the read period, the clock signals CLKa and CLKb and the reset signal RST turn to the LOW level, and the read signal RWS turns to a HIGH level for read. Herein, the transistors T1a and T1b turn off. Herein, the potentials Vinta and Vintb rise by an amount corresponding to a rise amount of a potential at the read signal RWS, a current Ia in an amount corresponding to the potential Vinta flows between the drain and the source of the transistor M1a, and a current Ib in an amount corresponding to the potential Vintb flows between the drain and the source of the transistor M1b (FIG. 12 (f)). The current Ia is input to the source driver circuit 6 via the output line OUTa, and the current Ib is input to the source driver circuit 6 via the output line OUTb.

As described above, the pixel circuit 30 according to this embodiment has the configuration that the first and second pixel circuits 10a and 10b according to the first embodiment share the one photodiode D1 (optical sensor). In the shared photodiode D1, the cathode is connected to the source of the transistor T1a included in the section corresponding to the first pixel circuit and the source of the transistor T1b included in the section corresponding to the second pixel circuit.

According to the pixel circuit 30, as in the first and second pixel circuits 10a and 10b according to the first embodiment, it is possible to detect the amount of light when the backlight is turned on and the amount of light when the backlight is turned off. Moreover, by causing the pixel circuits of two types share the one photodiode D1, it is possible to cancel an influence of a variation in sensitivity characteristics of the photodiode, and to accurately obtain a difference between the amount of light when the backlight is turned on and the amount of light when the backlight is turned off. Moreover, it is possible to reduce the number of photodiodes, to increase an aperture ratio, and to enhance the sensitivity of the sensor pixel circuit.

(Fourth Embodiment)

Figure 14:
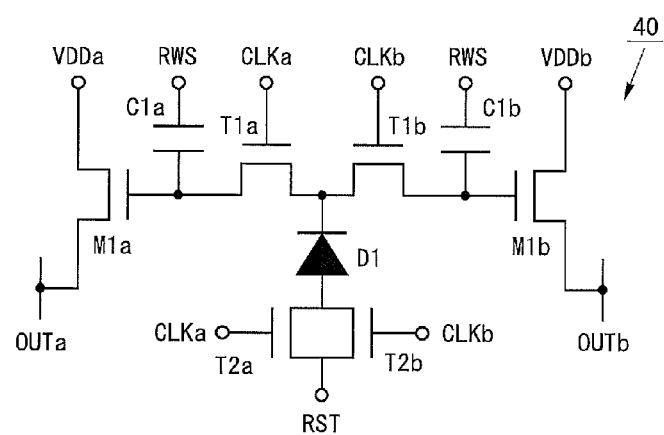
FIG. 14 is a circuit diagram of a sensor pixel circuit according to a fourth embodiment of the present invention.

FIG. 14 is a circuit diagram of a pixel circuit according to a fourth embodiment of the present invention. A pixel circuit 40 shown in FIG. 14 includes transistors T1a, T1b, T2a, T2a, M1a and M1b, a photodiode D1, and capacitors C1a and C1b. Each of the transistors T1a, T1b, T2a, T2b, M1a and M1b is an N-type TFT. In FIG. 14, the left half corresponds to a first pixel circuit and the right half corresponds to a second pixel circuit. The pixel circuit 40 is connected to clock lines CLKa and CLKb, a reset line RST, a read line RWS, power supply lines VDDa and VDDb, and output lines OUTa and OUTb.

As shown in FIG. 14, gates of the transistors T1a and T2a are connected to the clock line CLKa, and gates of the transistors T2a and T2b are connected to the clock line CLKb. In the transistors T2a and T2b, sources are connected to the reset line RST, and drains are connected to an anode of the photodiode D1. A cathode of the photodiode D1 is connected to sources of the transistors T1a and T1b. In the transistor T1a, the gate is connected to the clock line CLKa, and a drain is connected to a gate of the transistor M1a. In the transistor M1a, a drain is connected to the power supply line VDDa, and a source is connected to the output line OUTa. The capacitor C1a is provided between the gate of the transistor M1a and the read line RWS. In the transistor T1b, a gate is connected to the clock line CLKb, and a drain is connected to a gate of the transistor M1b. In the transistor M1b, a drain is connected to the power supply line VDDb, and a source is connected to the output line OUTb. The capacitor C1b is provided between the gate of the transistor M1b and the read line RWS. In the pixel circuit 40, a node connected to the gate of the transistor M1a serves as a first accumulation node, a node connected to the gate of the transistor M1b serves as a second accumulation node, and each of the transistors M1a and M1b functions as a read transistor.

Figure 15:
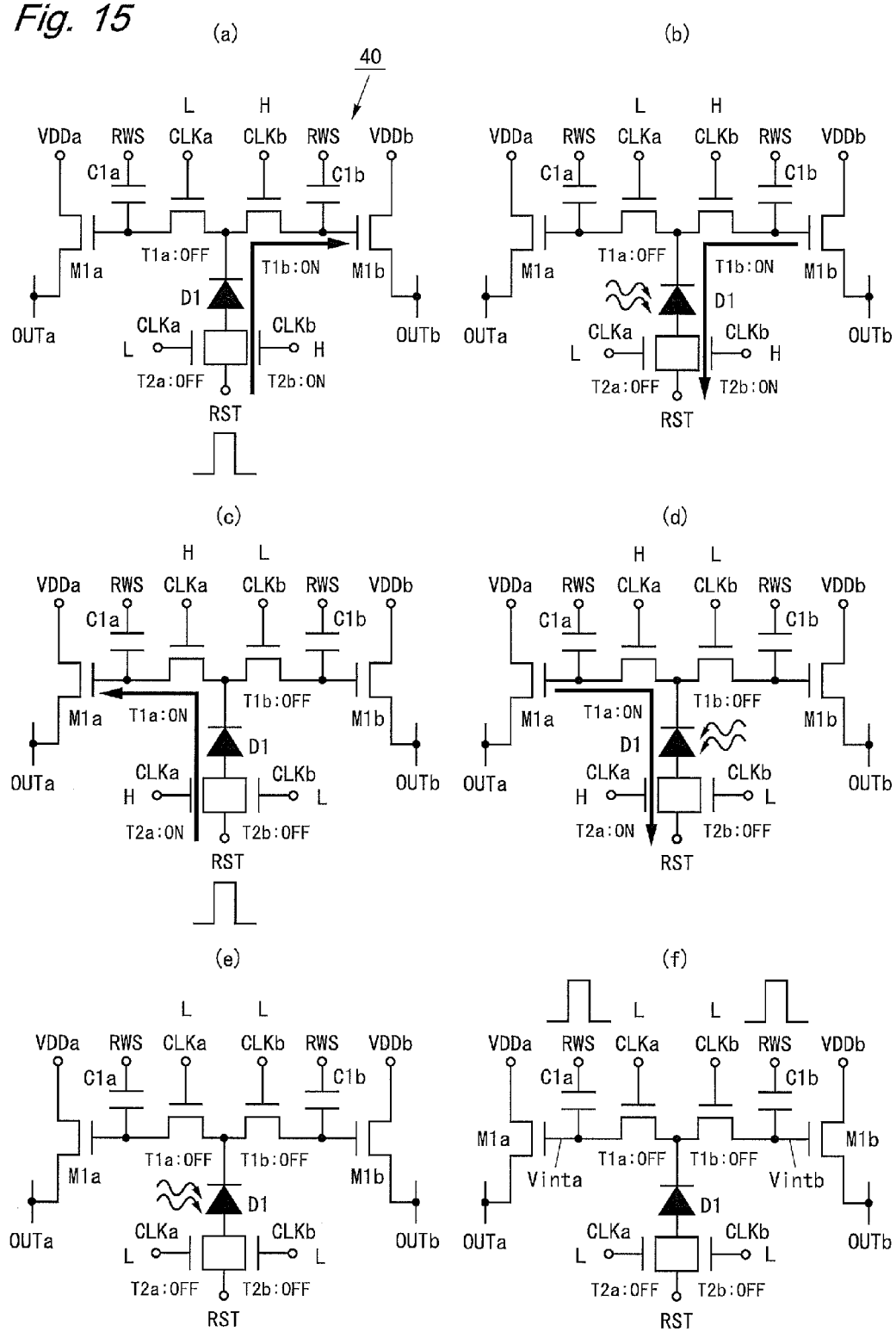
FIG. 15 is a diagram showing operations of the sensor pixel circuit shown in FIG. 14.

FIG. 15 is a diagram showing operations of the pixel circuit 40. As shown in FIG. 15, the pixel circuit 40 performs (a) reset when a backlight is turned off, (b) accumulation when the backlight is turned off, (c) reset when the backlight is turned on, (d) accumulation when the backlight is turned on, (e) retention, and (f) read, in a one-frame period. A signal waveform diagram of the pixel circuit 40 is equal to that in third embodiment (FIG. 13). The pixel circuit 40 operates as in the pixel circuit 30 according to the third embodiment, except that the transistors T2a and T2b turn on or off at a timing which is equal to that of the transistors T1a and T2a, respectively.

As described above, the pixel circuit 40 according to this embodiment has the configuration that the first and second pixel circuits 20a and 20b according to the second embodiment share the one photodiode D1 (optical sensor). In the shared photodiode D1, the cathode is connected to the source of the transistor T1a included in the section corresponding to the first pixel circuit and the source of the transistor T1b included in the section corresponding to the second pixel circuit. The anode of the photodiode D1 is connected to the drain of the transistor T2a included in the section corresponding to the first pixel circuit and the drain of the transistor T2b included in the section corresponding to the second sensor pixel circuit.

According to the pixel circuit 40, as in the first and second pixel circuits 20a and 20b according to the second embodiment, it is possible to detect an amount of light when the backlight is turned on and an amount of light when the backlight is turned off. Moreover, as in the second embodiment, it is possible to reduce leakage currents flowing through the transistors T1a and T1b, to prevent variations of potentials at the first and second accumulation nodes, and to enhance detection accuracy. Moreover, by causing the pixel circuits of two types share the one photodiode D1, it is possible to cancel an influence of a variation in sensitivity characteristics of the photodiode, and to accurately obtain a difference between the amount of light when the backlight is turned on and the amount of light when the backlight is turned off. Moreover, it is possible to reduce the number of photodiodes, to increase an aperture ratio, and to enhance the sensitivity of the sensor pixel circuit.

(Fifth Embodiment)

Figure 16:
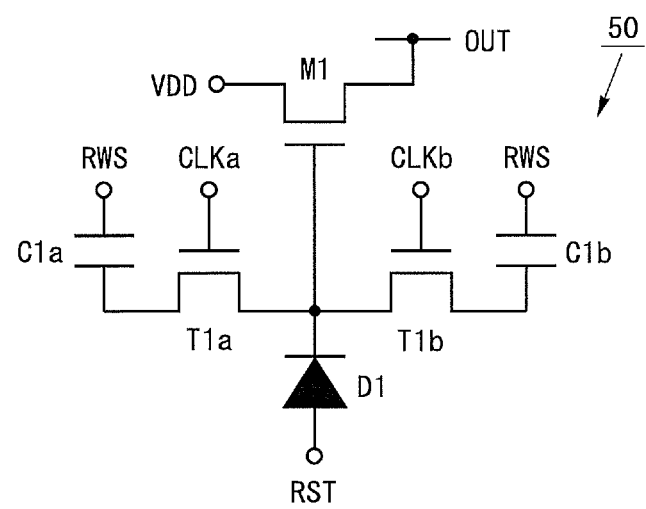
FIG. 16 is a circuit diagram of a sensor pixel circuit according to a fifth embodiment of the present invention.

FIG. 16 is a circuit diagram of a pixel circuit according to a fifth embodiment of the present invention. A pixel circuit 50 shown in FIG. 16 includes transistors T1a, T1b and M1, a photodiode D1, and capacitors C1a and C1b. Each of the transistors T1a, T1b and M1 is an N-type TFT. In FIG. 16, the left half corresponds to a first pixel circuit and the right half corresponds to a second pixel circuit. The pixel circuit 50 is connected to clock lines CLKa and CLKb, a reset line RST, a read line RWS, a power supply line VDD, and an output line OUT.

As shown in FIG. 16, in the photodiode D1, an anode is connected to the reset line RST, and a cathode is connected to sources of the transistors T1a and T1b and a gate of the transistor M1. A gate of the transistor T1a is connected to the clock line CLKa, and a gate of the transistor T1b is connected to the clock line CLKb. The capacitor C1a is provided between a drain of the transistor T1a and the read line RWS. The capacitor C1b is provided between a drain of the transistor T1b and the read line RWS. In the transistor M1, a drain is connected to the power supply line VDD, and a source is connected to the output line OUT. In the pixel circuit 50, a node connected to the drain of the transistor T1a serves as a first accumulation node, a node connected to the drain of the transistor T1b serves as a second accumulation node, and the transistor M1 functions as a read transistor.

Figure 17:
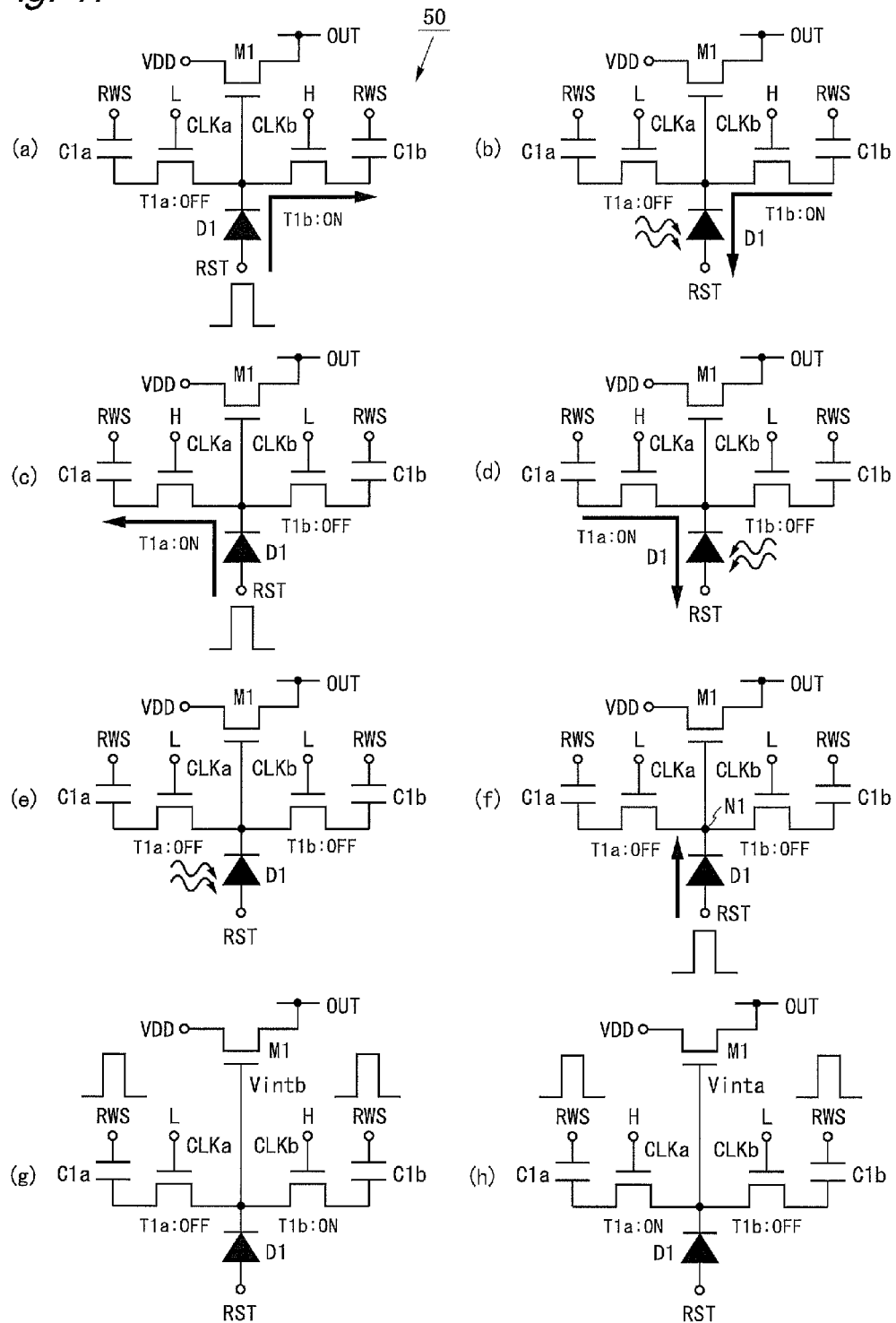
FIG. 17 is a diagram showing operations of the sensor pixel circuit shown in FIG. 16.

FIG. 17 is a diagram showing operations of the pixel circuit 50. As shown in FIG. 17, the pixel circuit 50 performs (a) reset when a backlight is turned off, (b) accumulation when the backlight is turned off, (c) reset when the backlight is turned on, (d) accumulation when the backlight is turned on, (e) retention, (f) initialization immediately before read, (g) read of an amount of light when the backlight is turned off, and (h) read of an amount of light when the backlight is turned on, in a one-frame period. The initialization immediately before read is performed twice, that is, before the read of the amount of light when the backlight is turned off and before the read of the amount of light when the backlight is turned on.

Figure 18:
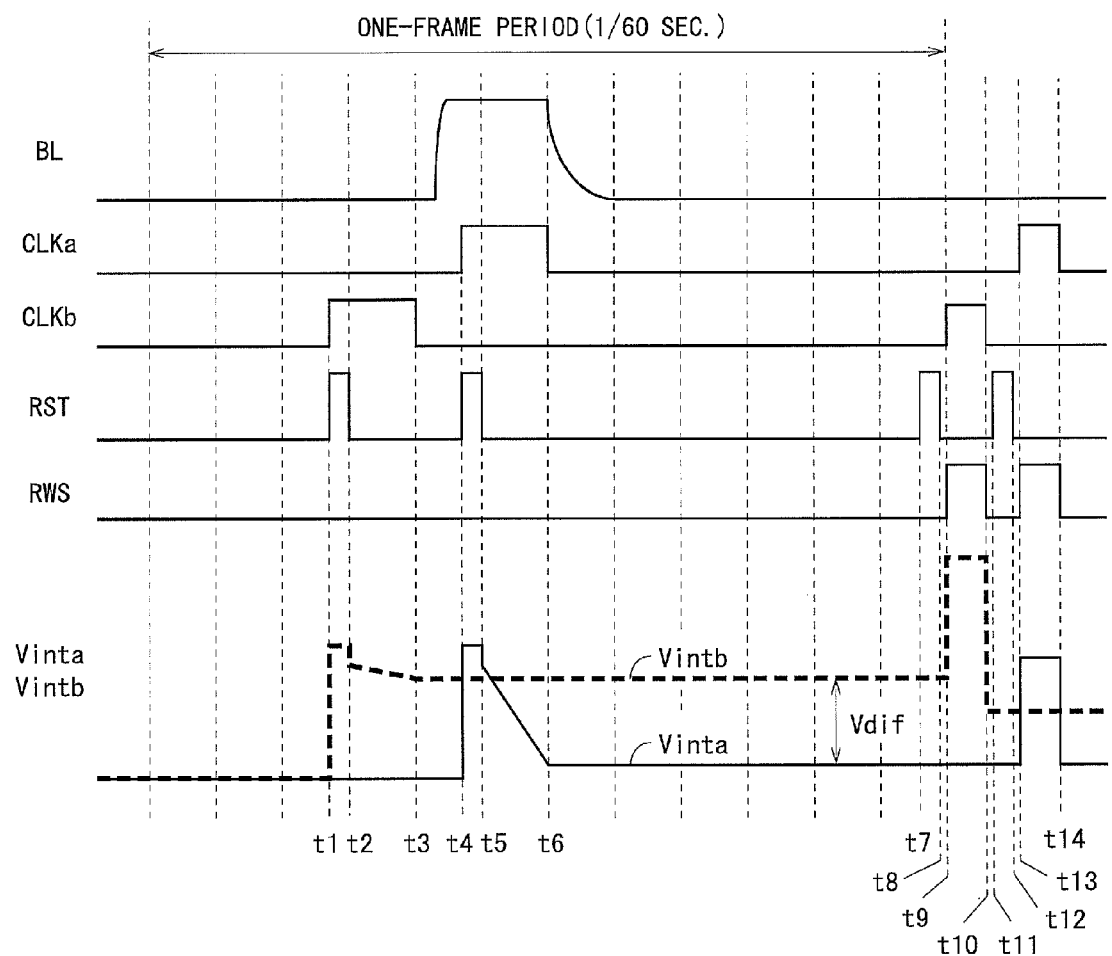
FIG. 18 is a signal waveform diagram of the sensor pixel circuit shown in FIG. 16.

FIG. 18 is a signal waveform diagram of the pixel circuit 50. In FIG. 18, Vinta represents a potential at the first accumulation node (a drain potential at the transistor T1a), and Vintb represents a potential at the second accumulation node (a drain potential at the transistor T1b). In FIG. 18, a reset period when the backlight is turned off corresponds to a range from a time t1 to a time t2, an accumulation period when the backlight is turned off corresponds to a range from the time t2 to a time t3, a reset period when the backlight is turned on corresponds to a range from a time t4 to a time t5, an accumulation period when the backlight is turned on corresponds to a range from the time t5 to a time t6, retention periods correspond to a range from the time t3 to the time t4 and a range from the time t6 to a time t7, initialization periods immediately before read correspond to a range from the time t7 to a time t8 and a range from a time t11 to a time t12, a read period for the amount of light when the backlight is turned off corresponds to a range from a time t9 to a time t10, and a read period for the amount of light when the backlight is turned on corresponds to a range from a time t13 to a time t14.

In the reset period when the backlight is turned off, the accumulation period when the backlight is turned off, the reset period when the backlight is turned on, the accumulation period when the backlight is turned on, and the retention period, the pixel circuit 50 operates as in the pixel circuit 30 according to the third embodiment (FIG. 17 (a) to (e)).

In the initialization period immediately before read, clock signals CLKa and CLKb and a read signal RWS turn to a LOW level, and a reset signal RST turns to a HIGH level for reset. Herein, the transistors T1a and T1b turn off. Accordingly, a current (a forward current in the photodiode D1) flows from the reset line RST via the photodiode D1 into a node N1 connected to the cathode of the photodiode D1 (FIG. 17 (f)), and a potential at the node N1 is reset to a predetermined level.

In the read period for the amount of light when the backlight is turned off, the clock signal CLKb turns to a HIGH level, the clock signal CLKa and the reset signal RST turn to the LOW level, and the read signal RWS turns to a HIGH level for read. Herein, the transistor T1a turns off, and the transistor T1b turns on. Herein, the potential Vintb rises by an amount which is (Cqb/Cpb) times (Cpb: a capacitance value of the section corresponding to the second pixel circuit, Cqb: a capacitance value of the capacitor C1b) as large as a rise amount of a potential at the read signal RWS, and the transistor M1b drives the output line OUT in accordance with the potential Vintb (FIG. 17 (g)).

In the read period for the amount of light when the backlight is turned on, the clock signal CLKa turns to the HIGH level, the clock signal CLKb and the reset signal RST turn to the LOW level, and the read signal RWS turns to the HIGH level for read. Herein, the transistor T1a turns on, and the transistor T1b turns off. Herein, the potential Vinta rises by an amount which is (Cqa/Cpa) times (Cpa: a capacitance value of the section corresponding to the first pixel circuit, Cqa: a capacitance value of the capacitor C1a) as large as the rise amount of the potential at the read signal RWS, and the transistor M1a drives the output line OUT in accordance with the potential Vinta (FIG. 17 (h)).

As described above, the pixel circuit 50 according to this embodiment has the configuration that the first and second pixel circuits 10a and 10b according to the first embodiment share the photodiode D1 and the transistor M1 (read transistor). The gate (control terminal) of the shared transistor M1 is connected to one of the ends of the shared photodiode D1, one of the ends of the transistor T1a included in the section corresponding to the first pixel circuit, and one of the ends of the transistor T1b included in the section corresponding to the second pixel circuit. As described above, the gate of the transistor M1 is configured to be electrically connectable to the first and second accumulation nodes via the transistors T1a and T1b.

According to the pixel circuit 50, as in the pixel circuit 30 according to the third embodiment, it is possible to detect the amount of light when the backlight is turned on and the amount of light when the backlight is turned off. Moreover, by causing the pixel circuits of two types share the one photodiode D1, it is possible to attain effects which are similar to those in the third embodiment. Moreover, by causing the pixel circuits of two types share the transistor M1, it is possible to cancel an influence of a variation in threshold value characteristics of the transistor M1, and to accurately obtain a difference between the amount of light when the backlight is turned on and the amount of light when the backlight is turned off.

(Sixth Embodiment)

Figure 19:
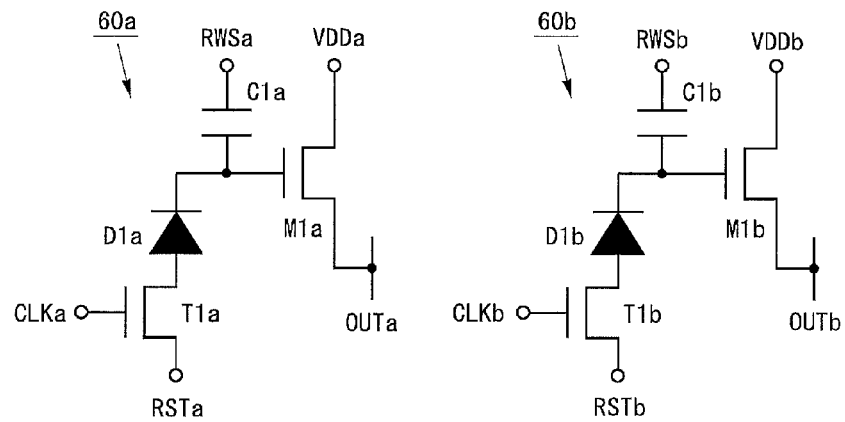
FIG. 19 is a circuit diagram of sensor pixel circuits according to a sixth embodiment of the present invention.

FIG. 19 is a circuit diagram of pixel circuits according to a sixth embodiment of the present invention. As shown in FIG. 19, a first pixel circuit 60a includes transistors T1a and M1a, a photodiode D1a, and a capacitor C1a. A second pixel circuit 60b includes transistors T1b and M1b, a photodiode D1b, and a capacitor C1b. Each of the transistors T1a, M1a, T1b and M1b is an N-type TFT.

With regard to the first pixel circuit 60a, in the transistor T1a, a source is connected to a reset line RSTa, a gate is connected to a clock line CLKa, and a drain is connected to an anode of the photodiode D1a. A cathode of the photodiode D1a is connected to a gate of the transistor M1a. In the transistor M1a, a drain is connected to a power supply line VDDa, and a source is connected to an output line OUTa. The capacitor C1a is provided between the gate of the transistor M1a and a read line RWSa. In the first pixel circuit 60a, a node connected to the gate of the transistor Ma serves as an accumulation node, and the transistor M1a functions as a read transistor. The second pixel circuit 60b has a configuration which is equal to that of the first pixel circuit 60a.

The first and second pixel circuits 60a and 60b operate as in the first and second pixel circuits 10a and 10b according to the first embodiment (see FIG. 7). A signal waveform diagram of the first and second pixel circuits 60a and 60b is equal to that in the first embodiment (FIG. 8).

As described above, the first pixel circuit 60a according to this embodiment includes the constituent elements which are equal to those of the first pixel circuit 10a according to the first embodiment. However, in the first pixel circuit 60a, the photodiode D1a is provided between the accumulation node and one of the ends of the transistor T1a, and the other end of the transistor T1a is connected to the reset line RSTa. The transistor T1a turns on during a sensing period when the backlight is turned on, in accordance with the clock signal CLKa. The second pixel circuit 60b has the configuration which is similar to that of the first pixel circuit 60a, and the transistor T1b included in the second pixel circuit 60b turns on during a sensing period when the backlight is turned off.

As described above, the transistor T1a that turns on during the sensing period when the backlight is turned on is provided on the path for the current flowing through the photodiode D1a, and the transistor T1b that turns on during the sensing period when the backlight is turned off is provided on the path for the current flowing through the photodiode D1b. Thus, it is possible to constitute the first pixel circuit 60a that senses light during the sensing period when the backlight is turned on and retains the amount of sensed light otherwise, and the second pixel circuit 60b that senses light during the sensing period when the backlight is turned off and retains the amount of sensed light otherwise.

(Seventh Embodiment)

Figure 20:
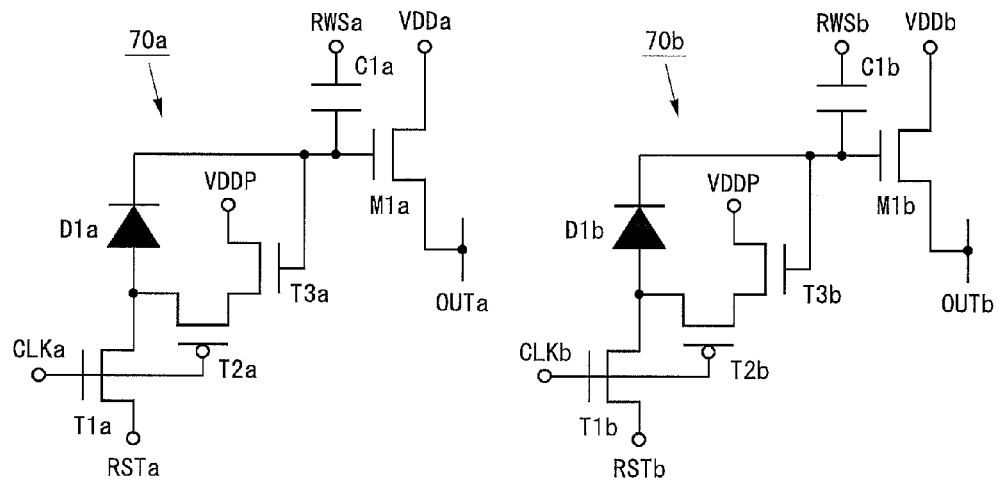
FIG. 20 is a circuit diagram of sensor pixel circuits according to a seventh embodiment of the present invention.

FIG. 20 is a circuit diagram of pixel circuits according to a seventh embodiment of the present invention. As shown in FIG. 20, a first pixel circuit 70a includes transistors T1a, T2a, T3a and M1a, a photodiode D1a, and a capacitor C1a. A second pixel circuit 70b includes transistors T1b, T2b, T3b and M1b, a photodiode D1b, and a capacitor C1b. Each of the transistors T1a, T3a, M1a, T1b, T3b and M1b is an N-type TFT, and each of the transistors T2a and T2b is a P-type TFT. A HIGH-level potential VDDP is supplied to the first pixel circuit 70a and the second pixel circuit 70b.

With regard to the first pixel circuit 70a, gates of the transistors T1a and T2a are connected to a clock line CLKa. In the transistor T1a, a source is connected to a reset line RSTa, and a drain is connected to an anode of the photodiode D1a and a drain of the transistor T2a. A cathode of the photodiode D1a is connected to a gate of the transistor M1a. In the transistor M1a, a drain is connected to a power supply line VDDa, and a source is connected to an output line OUTa. The capacitor C1a is provided between the gate of the transistor M1a and a read line RWSa. In the transistor T3a, a drain is applied with a potential VDDP, a gate is connected to the gate of the transistor M1a, and a source is connected to a source of the transistor T2a. In the first pixel circuit 70a, a node connected to the gate of the transistor M1a serves as an accumulation node, and the transistor M1a functions as a read transistor. The second pixel circuit 70b has a configuration which is equal to that of the first pixel circuit 70a.

The first and second pixel circuits 70a and 70b operate as in the first and second pixel circuits 60a and 60b according to the sixth embodiment, except for the following points. The transistor T2a turns off when the clock signal CLKa is in a HIGH level, and turns on when the clock signal CLKa is in a LOW level. The transistor T2b turns off when the clock signal CLKb is in the HIGH level, and turns on when the clock signal CLKb is in the LOW level.

Upon completion of a sensing period when a backlight is turned on, when the clock signal CLKa changes from the HIGH level to the LOW level, the transistor T2a changes off to on. At this moment, a node connected to the anode of the photodiode D1a is charged with a potential corresponding to a gate potential Vinta at the transistor M1a, via the transistors T2a and T3a. Therefore, a current flowing through the photodiode D1a is interrupted immediately upon completion of the sensing period when the backlight is turned on.

Moreover, upon completion of a sensing period when the backlight is turned off, when the clock signal CLKb changes from the HIGH level to the LOW level, the transistor T2b changes off to on. At this moment, a node connected to the anode of the photodiode D1b is charged with a potential corresponding to a gate potential Vintb at the transistor M1b, via the transistors T2b and T3b. Therefore, a current flowing through the photodiode D1b is interrupted immediately upon completion of the sensing period when the backlight is turned off.

As described above, the first pixel circuit 70a according to this embodiment corresponds to the first pixel circuit 60a according to the sixth embodiment additionally including the transistor T2a (first switching element) which has one of the ends connected to the anode (transistor T1a-side terminal) of the photodiode D1a and turns on or off in accordance with the clock signal CLKa, and the transistor T3a (second switching element) which feeds the potential corresponding to the potential at the accumulation node to the source of the transistor T2a. The transistor T2a turns on when the clock signal CLKa is in the LOW level (during a period other than the sensing period when the backlight is turned on). The second pixel circuit 10b has the configuration which is similar to that of the first pixel circuit 10a, and the transistor T2b included in the second pixel circuit 70b turns on when the clock signal CLKb is in the LOW level (during a period other than the sensing period when the backlight is turned off).

According to the first and second pixel circuits 70a and 70b, as in the first and second pixel circuits 60a and 60b according to the sixth embodiment, it is possible to detect an amount of light when the backlight is turned on and an amount of light when the backlight is turned off. Moreover, by applying the potential corresponding to the potential at the accumulation node to the terminal, which is opposed to the accumulation node, of the photodiode D1a upon change of the clock signal CLKa, it is possible to immediately interrupt the current flowing through the photodiode D1a, and to enhance detection accuracy. With regard to the second pixel circuit 70b, it is also possible to attain similar effects.

(Modification Examples of Embodiments)

The respective embodiments of the present invention may employ the following modification examples. FIGS. 21A to 21H are circuit diagrams of pixel circuits according to first to eighth modification examples of the first embodiment. First pixel circuits 11a to 18a shown in FIGS. 21A to 21H are achieved in such a manner that the first pixel circuit 10a according to the first embodiment is subjected to the following modifications. Second pixel circuits 11b to 18b are achieved in such a manner that the second pixel circuit 10b according to the first embodiment is subjected to the same modifications.

Figure 21A:
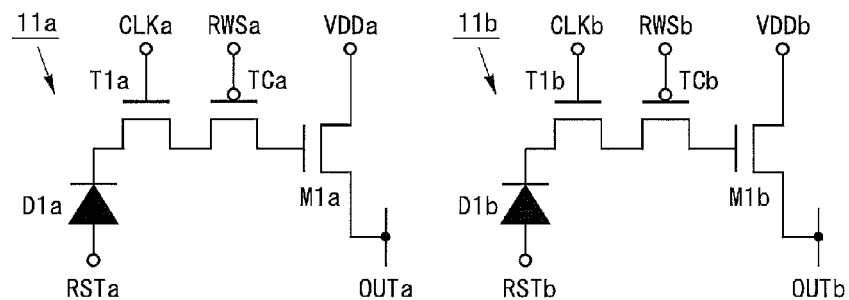
FIG. 21A is a circuit diagram of sensor pixel circuits according to a first modification example of the first embodiment.

The first pixel circuit 11a shown in FIG. 21A corresponds to the first pixel circuit 10a in which the capacitor C1 is substituted with a transistor TCa which is a P-type TFT. With regard to the first pixel circuit 11a, in the transistor TCa, a drain is connected to a drain of a transistor T1a, a source is connected to a gate of a transistor M1a, and a gate is connected to a read line RWSa. When a HIGH level for read is applied to the read line RWSa, the transistor TCa having the connection form described above causes a larger change in a potential at an accumulation node, as compared with the original pixel circuit. Accordingly, it is possible to amplify a difference between a potential at the accumulation node in the case where incident light is strong and a potential at the accumulation node in the case where incident light is weak, and to improve the sensitivity of the pixel circuit 11a.

Figure 21B:
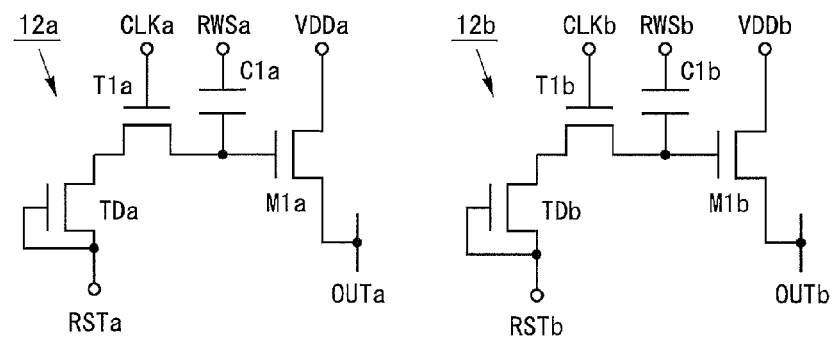
FIG. 21B is a circuit diagram of sensor pixel circuits according to a second modification example of the first embodiment.

The first pixel circuit 12a shown in FIG. 21B corresponds to the first pixel circuit 10a in which the photodiode D1 is substituted with a phototransistor TDa. Thus, all the transistors included in the first pixel circuit 12a are of an N-type. Accordingly, it is possible to manufacture the first pixel circuit 12a by use of a single channel process capable of manufacturing only N-type transistors.

Figure 21C:
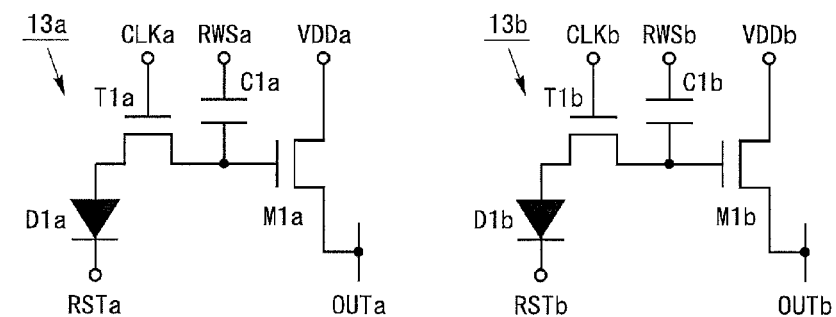
FIG. 21C is a circuit diagram of sensor pixel circuits according to a third modification example of the first embodiment.

The first pixel circuit 13a shown in FIG. 21C corresponds to the first pixel circuit 10a in which the photodiode D1a is connected in reverse. The first pixel circuit 13a is supplied with a reset signal RSTa which is in a HIGH level in a normal condition and turns to a LOW level for reset at the time of reset. In the photodiode D1a, a cathode is connected to a reset line RSTa, and an anode is connected to a drain of a transistor T1a. Thus, it is possible to achieve a variety of pixel circuits.

Figure 21D:
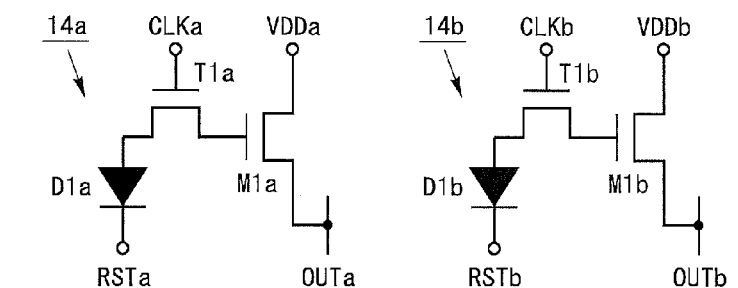
FIG. 21D is a circuit diagram of sensor pixel circuits according to a fourth modification example of the first embodiment.

The first pixel circuit 14a shown in FIG. 21D corresponds to the first pixel circuit 10a in which the photodiode D1a is connected in reverse and from which the capacitor C1a is removed. The first pixel circuit 14a is supplied with a reset signal RSTa which is similar to that of the first pixel circuit 13a. However, the reset signal RSTa turns to a HIGH level for read at the time of read. When the reset signal RSTa turns to the HIGH level for read, a potential at an accumulation node (a gate potential at a transistor M1a) rises, and a current corresponding to the potential at the accumulation node flows into the transistor M1a. As described above, the first pixel circuit 14a does not include the capacitor C1a. Accordingly, it is possible to increase an aperture ratio by virtue of the removal of the capacitor C1a, and to improve the sensitivity of the pixel circuit.

Figure 21E:
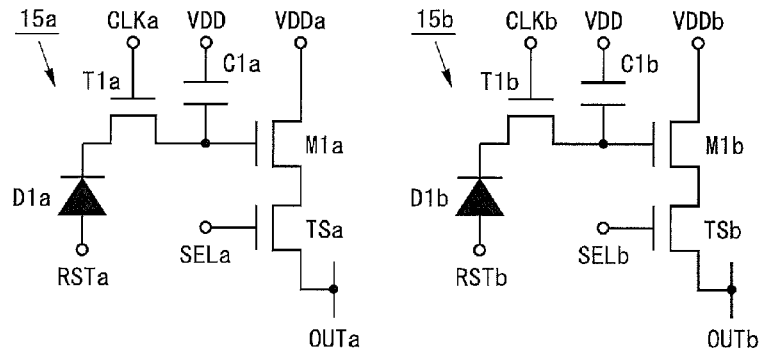
FIG. 21E is a circuit diagram of sensor pixel circuits according to a fifth modification example of the first embodiment.

The first pixel circuit 15a shown in FIG. 21E corresponds to the first pixel circuit 10a to which a transistor TSa is added. The transistor TSa is an N-type TFT, and functions as a switching element for selection. With regard to the first pixel circuit 15a, a source of a transistor M1a is connected to a drain of the transistor TSa. In the transistor TSa, a source is connected to an output line OUTa, and a gate is connected to a selection line SELa. A selection signal SELa turns to a HIGH level at the time of read from the first pixel circuit 15a. Thus, it is possible to achieve a variety of pixel circuits.

Figure 21F:
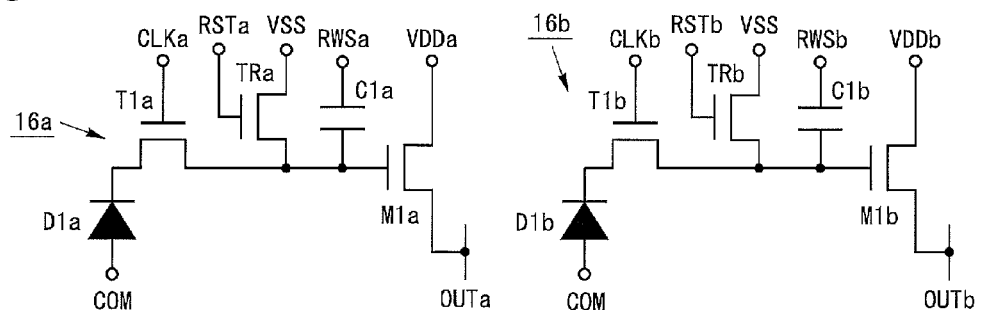
FIG. 21F is a circuit diagram of sensor pixel circuits according to a sixth modification example of the first embodiment.

The first pixel circuit 16a shown in FIG. 21F corresponds to the first pixel circuit 10a to which a transistor TRa is added. The transistor TRa is an N-type TFT, and functions as a switching element for reset. With regard to the first pixel circuit 16a, in the transistor TRa, a source is applied with a LOW-level potential VSS, a drain is connected to a gate of a transistor M1a, and a gate is connected to a reset line RSTa. Moreover, an anode of a photodiode D1a is applied with a LOW-level potential COM. Thus, it is possible to achieve a variety of pixel circuits.

Figure 21G:
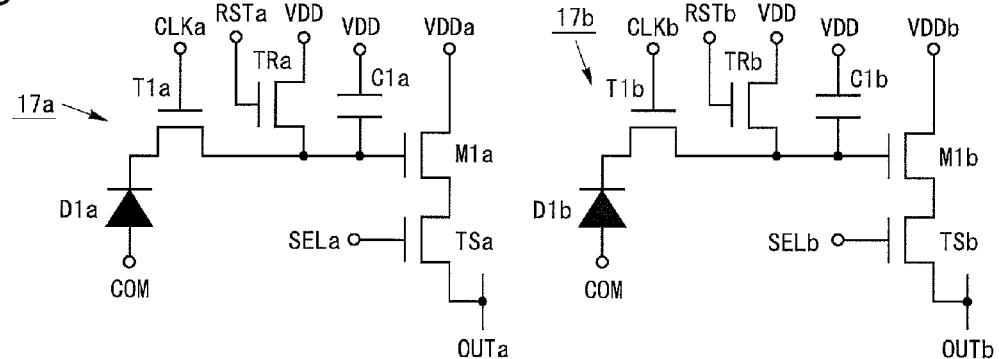
FIG. 21G is a circuit diagram of sensor pixel circuits according to a seventh modification example of the first embodiment.

The first pixel circuit 17a shown in FIG. 21G corresponds to the first pixel circuit 10a to which the transistors TSa and TRa described above are added. Connection forms of the transistors TSa and TRa are equal to those in the first pixel circuits 15a and 16a. Thus, it is possible to achieve a variety of pixel circuits.

Figure 21H:
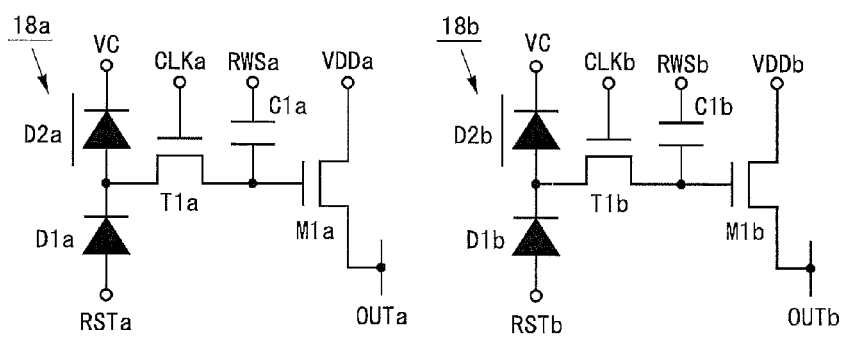
FIG. 21H is a circuit diagram of sensor pixel circuits according to an eighth modification example of the first embodiment.
Figure 22:
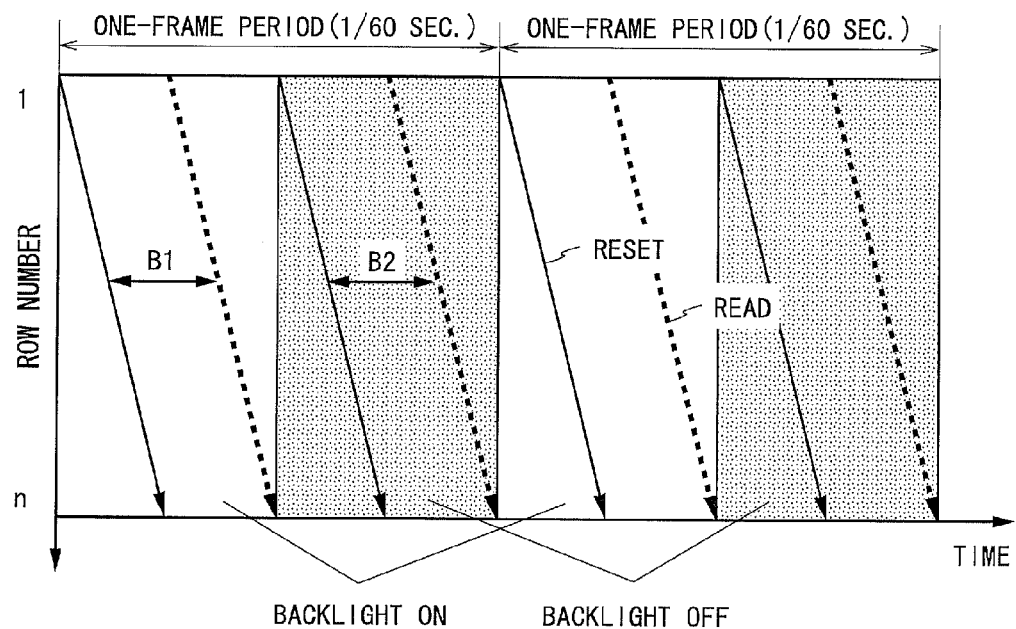
FIG. 22 is a diagram showing turn-on and turn-off timings of a backlight as well as reset and read timings of light receiving elements, in a conventional input/output device.
Figure 23:
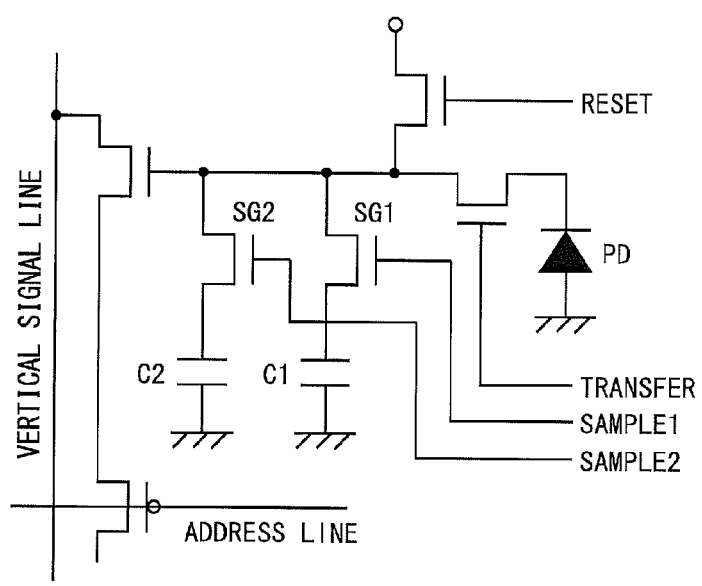
FIG. 23 is a circuit diagram of a unit light receiving section included in a conventional solid-state imaging device.

The first pixel circuit 18a shown in FIG. 21H corresponds to the first pixel circuit 10a to which a photodiode D2a is added. The photodiode D2a is shielded from light, and functions as an optical sensor for reference. In the photodiode D2a, an anode is connected to a cathode of a photodiode D1a and a source of a transistor T1a, and a cathode is applied with a predetermined potential VC. The potential VC is a potential which is higher than a HIGH-level potential for reset. It is possible to perform temperature compensation for the photodiode since a dark current flows through the photodiode D2a.

Similar modifications can be carried out on the second to seventh embodiments. Moreover, the first to seventh embodiments may employ various modification examples in such a manner that the modifications described above are combined arbitrarily without violating their properties.

As described above, in the display devices according to the embodiments of the present invention and the modification examples of the embodiments, the plurality of first and second sensor pixel circuits each sensing light during the designated sensing period and retaining the amount of sensed light otherwise are arranged in the pixel region. The backlight is turned on once for the predetermined time in the one-frame period. The sensing period when the backlight is turned on and the sensing period when the backlight is turned off are set once, respectively, in the one-frame period. The first sensor pixel circuit is reset at the start of the sensing period when the backlight is turned on, and senses light in this sensing period. The second sensor pixel circuit is reset at the start of the sensing period when the backlight is turned off, and senses light in this sensing period. The read from the sensor pixel circuits of two types is performed in parallel in a line sequential manner during a period other than the two types of sensing periods. The difference circuit provided on the outside of the sensor pixel circuits obtains the difference between the amount of light when the backlight is turned on and the amount of light when the backlight is turned off. Thus, it is possible to solve the conventional problems and to give an input function which does not depend on light environments.

It is to be noted that the type of a light source to be provided on the display device is not particularly limited in the present invention. Accordingly, for example, a visible light backlight to be provided for display may be turned on once for a predetermined time in a one-frame period. Alternatively, an infrared light backlight for light sensing may be provided separately from the visible light backlight for display on the display device. In such a display device, the visible light backlight may always be turned on, and only the infrared light backlight may be turned on once for a predetermined time in the one-frame period.

Moreover, the backlight may be turned on a plurality of times for a predetermined time in the one-frame period. In this case, the sensing period when the backlight is turned on may be set over a plurality of periods in which the backlight is turned on, and the sensing period when the backlight is turned off may be set at the remaining period. Also in this case, it is preferable that the sensing period when the backlight is turned on is set to be equal in length to the sensing period when the backlight is turned off. Moreover, the sensing period when the backlight is turned off may be set immediately after the sensing period when the backlight is turned on. Thus, it is possible to eliminate a deviation between the two types of sensing periods, to prevent followability to motion input from varying in accordance with a direction of the input, and to suppress a detection error resulting from leakage of light in the switching element included in the sensor pixel circuit.

INDUSTRIAL APPLICABILITY

The display device according to the present invention is characterized by having an input function which does not depend on light environments, and therefore is applicable to various display devices in which a plurality of optical sensors are provided on a display panel.

EXPLANATION OF REFERENCE SYMBOLS

1: Display control circuit
2: Display panel
3: Backlight
4: Pixel region
5: Gate driver circuit
6: Source driver circuit
7: Sensor row driver circuit
8: Display pixel circuit
9: Sensor pixel circuit
10 to 18, 20, 30, 40, 50, 60, 70: Pixel circuit

The invention claimed is:

1. A display device in which a plurality of optical sensors are arranged in a display region, the display device comprising:
 a display panel that includes a plurality of display pixel circuits and a plurality of sensor pixel circuits;
 a light source that is turned on for a predetermined time in a one-frame period; and
 a drive circuit that outputs, to the sensor pixel circuits, a first control signal indicating a sensing period at time when the light source is turned on and a second control signal indicating a sensing period when the light source is turned off, and performs reset for and read from the sensor pixel circuits, wherein
 the sensor pixel circuits include:
  a first sensor pixel circuit that senses light during the sensing period when the light source is turned on and retains the amount of sensed light otherwise, in accordance with the first control signal; and
  a second sensor pixel circuit that senses light during the sensing period when the light source is turned off and retains the amount of sensed light otherwise, in accordance with the second control signal, and
 the drive circuit performs the read from the first and second sensor pixel circuits in a line sequential manner during a period other than the sensing period when the light source is turned on and the sensing period when the light source is turned off.

2. The display device according to claim 1, wherein
the light source is turned on once for a predetermined time in the one-frame period, and
the sensing period when the light source is turned on and the sensing period when the light source is turned off are set once, respectively, in the one-frame period.

3. The display device according to claim 2, wherein
the drive circuit performs the reset for the first sensor pixel circuit at the start of the sensing period when the light source is turned on, and performs the reset for the second sensor pixel circuit at the start of the sensing period when the light source is turned off.

4. The display device according to claim 2, wherein
the sensing period when the light source is turned on is set immediately after the sensing period when the light source is turned off.

5. The display device according to claim 2, wherein
the sensing period when the light source is turned off is set immediately after the sensing period when the light source is turned on.

6. The display device according to claim 2, wherein
the sensing period when the light source is turned on is equal in length to the sensing period when the light source is turned off.

7. The display device according to claim 1, wherein
the display panel further includes a plurality of output lines for propagating output signals from the first and second sensor pixel circuits,
the first and second sensor pixel circuits are connected to the different output lines depending on the type, and the drive circuit performs the read from the first and second sensor pixel circuits in parallel.

8. The display device according to claim 7, further comprising a difference circuit that obtains a difference between the output signal from the first sensor pixel circuit and the output signal from the second sensor pixel circuit.

9. The display device according to claim 1, wherein each of the first and second sensor pixel circuits includes:
one optical sensor;
one accumulation node accumulating charge corresponding to an amount of sensed light;
a read transistor having a control terminal being electrically connectable to the accumulation node; and
a retention switching element that is provided on a path for a current flowing through the optical sensor and turns on or off in accordance with the control signal,
the retention switching element included in the first sensor pixel circuit turns on, in accordance with the first control signal, during the sensing period when the light source is turned on, and
the retention switching element included in the second sensor pixel circuit turns on, in accordance with the second control signal, during the sensing period when the light source is turned off.

10. The display device according to claim 9, wherein
in each of the first and second sensor pixel circuits,
the retention switching element is provided between the accumulation node and one of ends of the optical sensor, and
the other end of the optical sensor is connected to a reset line.

11. The display device according to claim 9, wherein each of the first and second sensor pixel circuits includes, as the retention switching element:
a first retention switching element provided between the accumulation node and one of ends of the optical sensor; and
a second retention switching element provided between a reset line and the other end of the optical sensor.

12. The display device according to claim 10, wherein
the first and second sensor pixel circuits share one optical sensor between two types of circuits, and
the shared optical sensor has one of ends connected to one of ends of the retention switching element included in each of the first and second sensor pixel circuits, and the other end connected to the reset line.

13. The display device according to claim 11, wherein
the first and second sensor pixel circuits share one optical sensor between two types of circuits, and
the shared optical sensor has one of ends connected to one of ends of the first retention switching element included in each of the first and second sensor pixel circuits, and the other end connected to one of ends of the second retention switching element included in each of the first and second sensor pixel circuits.

14. The display device according to claim 12, wherein
the first and second sensor pixel circuits share one read transistor between two types of circuits, and
the shared read transistor has a control terminal connected to one of ends of the shared optical sensor and one of ends of the retention switching element included in each of the first and second sensor pixel circuits.

15. A method for driving a display device having a display panel that includes a plurality of display pixel circuits and a plurality of sensor pixel circuits, and a light source, the method comprising the steps of:
turning the light source on for a predetermined time in a one-frame period;
outputting, to the sensor pixel circuits, a first control signal indicating a sensing period when the light source is turned on and a second control signal indicating a sensing period when the light source is turned off;
sensing light during the sensing period when the light source is turned on and retaining the amount of sensed light otherwise, in accordance with the first control signal, by use of a first sensor pixel circuit included in the sensor pixel circuits;
sensing light during the sensing period when the light source is turned off and retaining the amount of sensed light otherwise, in accordance with the second control signal, by use of a second sensor pixel circuit included in the sensor pixel circuits; and
performing read from the first and second sensor pixel circuits in a line sequential manner during a period other than the sensing period when the light source is turned on and the sensing period when the light source is turned off.

* * * * *